(12) United States Patent
Park et al.

(10) Patent No.: US 12,445,181 B2
(45) Date of Patent: Oct. 14, 2025

(54) METHOD AND APPARATUS FOR PERFORMING TRANSMISSION AND RECEPTION OF CHANNEL STATE INFORMATION IN WIRELESS COMMUNICATION

(71) Applicant: LG ELECTRONICS INC., Seoul (KR)

(72) Inventors: Haewook Park, Seoul (KR); Hyungtae Kim, Seoul (KR); Jiwon Kang, Seoul (KR); Kyuseok Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 362 days.

(21) Appl. No.: 17/972,372

(22) Filed: Oct. 24, 2022

(65) Prior Publication Data

US 2023/0239025 A1 Jul. 27, 2023

(30) Foreign Application Priority Data

Jan. 21, 2022 (KR) .................. 10-2022-0009401

(51) Int. Cl.
*H04B 7/00* (2006.01)
*H04B 7/06* (2006.01)
(Continued)

(52) U.S. Cl.
CPC .......... *H04B 7/0626* (2013.01); *H04W 72/02* (2013.01); *H04W 72/0446* (2013.01)

(58) Field of Classification Search
CPC . H04B 7/0626; H04W 72/02; H04W 72/0446
See application file for complete search history.

(56) References Cited

U.S. PATENT DOCUMENTS

| 2015/0043499 A1* | 2/2015 | Yue | H04L 5/005 370/329 |
| 2021/0050889 A1* | 2/2021 | Park | H04B 7/0482 |

(Continued)

FOREIGN PATENT DOCUMENTS

| WO | WO-2018231812 A1 * | 12/2018 | ........... H04B 7/0626 |
| WO | WO-2021034672 A1 * | 2/2021 | ........... H04B 17/309 |
| WO | 2021162517 A1 | 8/2021 | |

OTHER PUBLICATIONS

Ericsson, "CSI feedback for multi-TRP," 3GPP TSG-RAN WG1 #91, R1-1720974, 8 pages, Dec. 2017.

(Continued)

*Primary Examiner* — Khai M Nguyen
(74) *Attorney, Agent, or Firm* — BRYAN CAVE LEIGHTON PAISNER LLP

(57) ABSTRACT

A method and an apparatus for transmitting and receiving channel state information (CSI) in a wireless communication system are disclosed. A method of performing CSI reporting by a user equipment (UE) in a wireless communication system according to an embodiment of the present disclosure may comprise: receiving, from a base station, configuration information related to the CSI reporting; receiving, from the base station, a first CSI-reference signal (CSI-RS) and a second CSI-RS based on the configuration information; and transmitting, to the base station, CSI acquired based on the first CSI-RS and the second CSI-RS. In here, a channel measurement resource for acquiring the CSI may include a first resource for the first CSI-RS and a second resource for the second CSI-RS, and the first resource and the second resource may be respectively associated with different Control Resource Set (CORESET) pool indices.

18 Claims, 13 Drawing Sheets

(51) Int. Cl.
*H04W 72/02* (2009.01)
*H04W 72/0446* (2023.01)

(56) References Cited

U.S. PATENT DOCUMENTS

2021/0391909 A1* 12/2021 Lee .................... H04B 7/063
2022/0239358 A1* 7/2022 Kim .................... H04B 17/336
2022/0279492 A1* 9/2022 Park .................... H04B 7/0628

OTHER PUBLICATIONS

ZTE, "Enhancements on beam management for multi-TRP," 3GPP TSG RAN WG1 Meeting #105-e, R1-2104587, 17 pages, May 2021.
ZTE, "CSI enhancements for Multi-TRP and FR1 FDD reciprocity," 3GPP TSG RAN WG1 #105-e, R1-2104589, 15 pages, May 2021.

* cited by examiner

TRS 0: TRP-specific TRS for TRP Id 0
TRS 1: TRP-specific TRS for TRP Id 1
TRS 2: SFNed TRS for TRP Id 0/1

METHOD AND APPARATUS FOR PERFORMING TRANSMISSION AND RECEPTION OF CHANNEL STATE INFORMATION IN WIRELESS COMMUNICATION

CROSS-REFERENCE TO RELATED APPLICATIONS

This application claims the benefit of earlier filing date and right of priority to Korean Application No. 10-2022-0009401, filed on Jan. 21, 2022, the contents of which are all hereby incorporated by reference herein in their entirety.

TECHNICAL FIELD

The present disclosure relates to a wireless communication system, and more particularly, to a method and apparatus for transmitting and receiving channel state information in a wireless communication system.

BACKGROUND

A mobile communication system has been developed to provide a voice service while guaranteeing mobility of users. However, a mobile communication system has extended even to a data service as well as a voice service, and currently, an explosive traffic increase has caused shortage of resources and users have demanded a faster service, so a more advanced mobile communication system has been required.

The requirements of a next-generation mobile communication system at large should be able to support accommodation of explosive data traffic, a remarkable increase in a transmission rate per user, accommodation of the significantly increased number of connected devices, very low End-to-End latency and high energy efficiency. To this end, a variety of technologies such as Dual Connectivity, Massive Multiple Input Multiple Output (Massive MIMO), In-band Full Duplex, Non-Orthogonal Multiple Access (NOMA), Super wideband Support, Device Networking, etc. have been researched.

SUMMARY

A technical object of the present disclosure is to provide a method and apparatus for transmitting and receiving channel state information (CSI) in a wireless communication system.

In addition, an additional technical object of the present disclosure is to provide a method and apparatus for configuring an antenna port, a codebook parameter and/or a CSI-reference signal (RS) in relation to the configuration of channel state information.

The technical objects to be achieved by the present disclosure are not limited to the above-described technical objects, and other technical objects which are not described herein will be clearly understood by those skilled in the pertinent art from the following description.

A method of performing CSI reporting by a user equipment (UE) in a wireless communication system according to an aspect of the present disclosure may comprise: receiving, from a base station, configuration information related to the CSI reporting; receiving, from the base station, a first CSI-reference signal (CSI-RS) and a second CSI-RS based on the configuration information; and transmitting, to the base station, CSI acquired based on the first CSI-RS and the second CSI-RS. In here, a channel measurement resource for acquiring the CSI may include a first resource for the first CSI-RS and a second resource for the second CSI-RS, and the first resource and the second resource may be respectively associated with different Control Resource Set (CORESET) pool indices.

A method of receiving CSI by a base station (BS) in a wireless communication system according to an additional aspect of the present disclosure may comprise: transmitting, to a user equipment, configuration information related to the CSI reporting; transmitting, to the user equipment, a first CSI-reference signal (CSI-RS) and a second CSI-RS based on the configuration information; and receiving, from the user equipment, CSI acquired based on the first CSI-RS and the second CSI-RS. In here, a channel measurement resource for acquiring the CSI may include a first resource for the first CSI-RS and a second resource for the second CSI-RS, and the first resource and the second resource may be respectively associated with different Control Resource Set (CORESET) pool indices.

According to an embodiment of the present disclosure, a method and apparatus for transmitting and receiving channel state information in a wireless communication system may be provided.

In addition, according to an embodiment of the present disclosure, a method and apparatus for setting an antenna port, a codebook parameter and/or a CSI-Reference Signal (RS) in relation to the configuration of channel state information may be provided.

Effects achievable by the present disclosure are not limited to the above-described effects, and other effects which are not described herein may be clearly understood by those skilled in the pertinent art from the following description.

BRIEF DESCRIPTION OF THE DRAWINGS

Accompanying drawings included as part of detailed description for understanding the present disclosure provide embodiments of the present disclosure and describe technical features of the present disclosure with detailed description.

DETAILED DESCRIPTION

Figure 1:
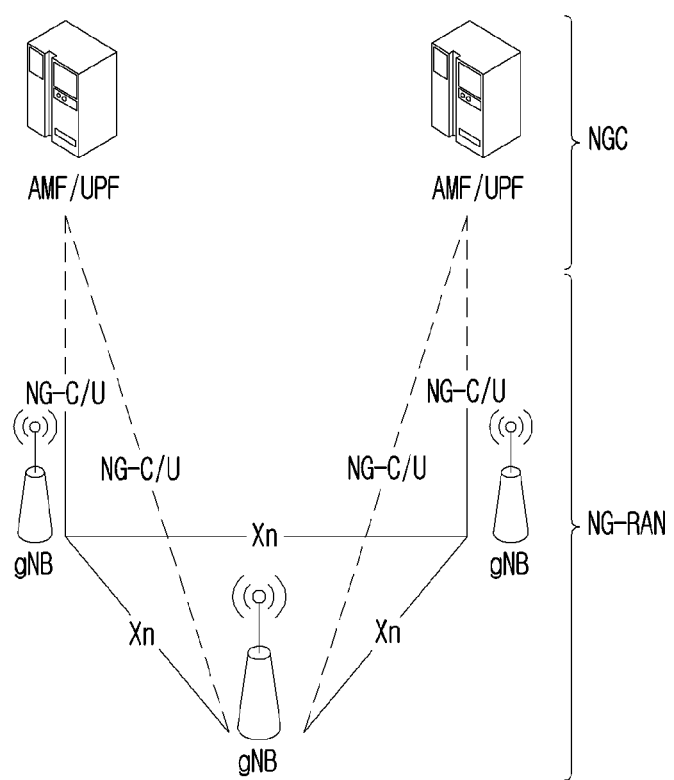
FIG. 1 illustrates a structure of a wireless communication system to which the present disclosure may be applied.

Hereinafter, embodiments according to the present disclosure will be described in detail by referring to accompanying drawings. Detailed description to be disclosed with accompanying drawings is to describe exemplary embodiments of the present disclosure and is not to represent the only embodiment that the present disclosure may be implemented. The following detailed description includes specific details to provide complete understanding of the present disclosure. However, those skilled in the pertinent art knows that the present disclosure may be implemented without such specific details.

In some cases, known structures and devices may be omitted or may be shown in a form of a block diagram based on a core function of each structure and device in order to prevent a concept of the present disclosure from being ambiguous.

In the present disclosure, when an element is referred to as being "connected", "combined" or "linked" to another element, it may include an indirect connection relation that yet another element presents therebetween as well as a direct connection relation. In addition, in the present disclosure, a term, "include" or "have", specifies the presence of a mentioned feature, step, operation, component and/or element, but it does not exclude the presence or addition of one or more other features, stages, operations, components, elements and/or their groups.

In the present disclosure, a term such as "first", "second", etc. is used only to distinguish one element from other element and is not used to limit elements, and unless otherwise specified, it does not limit an order or importance, etc. between elements. Accordingly, within a scope of the present disclosure, a first element in an embodiment may be referred to as a second element in another embodiment and likewise, a second element in an embodiment may be referred to as a first element in another embodiment.

A term used in the present disclosure is to describe a specific embodiment, and is not to limit a claim. As used in a described and attached claim of an embodiment, a singular form is intended to include a plural form, unless the context clearly indicates otherwise. A term used in the present disclosure, "and/or", may refer to one of related enumerated items or it means that it refers to and includes any and all possible combinations of two or more of them. In addition, "/" between words in the present disclosure has the same meaning as "and/or", unless otherwise described.

The present disclosure describes a wireless communication network or a wireless communication system, and an operation performed in a wireless communication network may be performed in a process in which a device (e.g., a base station) controlling a corresponding wireless communication network controls a network and transmits or receives a signal, or may be performed in a process in which a terminal associated to a corresponding wireless network transmits or receives a signal with a network or between terminals.

In the present disclosure, transmitting or receiving a channel includes a meaning of transmitting or receiving information or a signal through a corresponding channel. For example, transmitting a control channel means that control information or a control signal is transmitted through a control channel. Similarly, transmitting a data channel means that data information or a data signal is transmitted through a data channel.

Hereinafter, a downlink (DL) means a communication from a base station to a terminal and an uplink (UL) means a communication from a terminal to a base station. In a downlink, a transmitter may be part of a base station and a receiver may be part of a terminal. In an uplink, a transmitter may be part of a terminal and a receiver may be part of a base station. A base station may be expressed as a first communication device and a terminal may be expressed as a second communication device. A base station (BS) may be substituted with a term such as a fixed station, a Node B, an eNB(evolved-NodeB), a gNB(Next Generation NodeB), a BTS(base transceiver system), an Access Point(AP), a Network(5G network), an AI(Artificial Intelligence) system/module, an RSU(road side unit), a robot, a drone(UAV: Unmanned Aerial Vehicle), an AR(Augmented Reality) device, a VR(Virtual Reality) device, etc. In addition, a terminal may be fixed or mobile, and may be substituted with a term such as a UE(User Equipment), an MS(Mobile Station), a UT(user terminal), an MSS(Mobile Subscriber Station), an SS(Subscriber Station), an AMS(Advanced Mobile Station), a WT(Wireless terminal), an MTC(Machine-Type Communication) device, an M2M(Machine-to-Machine) device, a D2D(Device-to-Device) device, a vehicle, an RSU(road side unit), a robot, an AI(Artificial Intelligence) module, a drone(UAV: Unmanned Aerial Vehicle), an AR(Augmented Reality) device, a VR(Virtual Reality) device, etc.

The following description may be used for a variety of radio access systems such as CDMA, FDMA, TDMA, OFDMA, SC-FDMA, etc. CDMA may be implemented by a wireless technology such as UTRA(Universal Terrestrial Radio Access) or CDMA2000. TDMA may be implemented by a radio technology such as GSM(Global System for Mobile communications)/GPRS(General Packet Radio Service)/EDGE(Enhanced Data Rates for GSM Evolution). OFDMA may be implemented by a radio technology such as IEEE 802.11(Wi-Fi), IEEE 802.16(WiMAX), IEEE 802-20, E-UTRA(Evolved UTRA), etc. UTRA is a part of a UMTS (Universal Mobile Telecommunications System). 3GPP(3rd Generation Partnership Project) LTE(Long Term Evolution) is a part of an E-UMTS(Evolved UMTS) using E-UTRA and LTE-A(Advanced)/LTE-A pro is an advanced version of 3GPP LTE. 3GPP NR(New Radio or New Radio Access Technology) is an advanced version of 3GPP LTE/LTE-A/LTE-A pro.

To clarify description, it is described based on a 3GPP communication system (e.g., LTE-A, NR), but a technical idea of the present disclosure is not limited thereto. LTE means a technology after 3GPP TS(Technical Specification) 36.xxx Release 8. In detail, an LTE technology in or after 3GPP TS 36.xxx Release 10 is referred to as LTE-A and an LTE technology in or after 3GPP TS 36.xxx Release 13 is referred to as LTE-A pro. 3GPP NR means a technology in or after TS 38.xxx Release 15. LTE/NR may be referred to as a 3GPP system. "xxx" means a detailed number for a standard document. LTE/NR may be commonly referred to as a 3GPP system. For a background art, a term, an abbreviation, etc. used to describe the present disclosure, matters described in a standard document disclosed before the present disclosure may be referred to. For example, the following document may be referred to.

For 3GPP LTE, TS 36.211(physical channels and modulation), TS 36.212(multiplexing and channel coding), TS 36.213(physical layer procedures), TS 36.300(overall description), TS 36.331(radio resource control) may be referred to.

For 3GPP NR, TS 38.211(physical channels and modulation), TS 38.212(multiplexing and channel coding), TS 38.213(physical layer procedures for control), TS 38.214 (physical layer procedures for data), TS 38.300(NR and NG-RAN(New Generation-Radio Access Network) overall description), TS 38.331(radio resource control protocol specification) may be referred to.

Abbreviations of terms which may be used in the present disclosure is defined as follows.
- BM: beam management
- CQI: Channel Quality Indicator
- CRI: channel state information—reference signal resource indicator
- CSI: channel state information
- CSI-IM: channel state information interference measurement
- CSI-RS: channel state information—reference signal
- DMRS: demodulation reference signal
- FDM: frequency division multiplexing
- FFT: fast Fourier transform
- IFDMA: interleaved frequency division multiple access
- IFFT: inverse fast Fourier transform
- L1-RSRP: Layer 1 reference signal received power
- L1-RSRQ: Layer 1 reference signal received quality
- MAC: medium access control
- NZP: non-zero power
- OFDM: orthogonal frequency division multiplexing
- PDCCH: physical downlink control channel
- PDSCH: physical downlink shared channel
- PMI: precoding matrix indicator
- RE: resource element
- RI: Rank indicator
- RRC: radio resource control
- RSSI: received signal strength indicator
- Rx: Reception
- QCL: quasi co-location
- SINR: signal to interference and noise ratio
- SSB (or SS/PBCH block): Synchronization signal block (including PSS (primary synchronization signal), SSS (secondary synchronization signal) and PBCH (physical broadcast channel))
- TDM: time division multiplexing
- TRP: transmission and reception point
- TRS: tracking reference signal
- Tx: transmission
- UE: user equipment
- ZP: zero power Overall System As more communication devices have required a higher capacity, a need for an improved mobile broadband communication compared to the existing radio access technology (RAT) has emerged. In addition, massive MTC (Machine Type Communications) providing a variety of services anytime and anywhere by connecting a plurality of devices and things is also one of main issues which will be considered in a next-generation communication. Furthermore, a communication system design considering a service/a terminal sensitive to reliability and latency is also discussed. As such, introduction of a next-generation RAT considering eMBB(enhanced mobile broadband communication), mMTC(massive MTC), URLLC(Ultra-Reliable and Low Latency Communication), etc. is discussed and, for convenience, a corresponding technology is referred to as NR in the present disclosure. NR is an expression which represents an example of a 5G RAT.

A new RAT system including NR uses an OFDM transmission method or a transmission method similar to it. A new RAT system may follow OFDM parameters different from OFDM parameters of LTE. Alternatively, a new RAT system follows a numerology of the existing LTE/LTE-A as it is, but may support a wider system bandwidth (e.g., 100 MHz). Alternatively, one cell may support a plurality of numerologies. In other words, terminals which operate in accordance with different numerologies may coexist in one cell.

A numerology corresponds to one subcarrier spacing in a frequency domain. As a reference subcarrier spacing is scaled by an integer N, a different numerology may be defined.

FIG. 1 illustrates a structure of a wireless communication system to which the present disclosure may be applied.

In reference to FIG. 1, NG-RAN is configured with gNBs which provide a control plane (RRC) protocol end for a NG-RA(NG-Radio Access) user plane (i.e., a new AS(access stratum) sublayer/PDCP(Packet Data Convergence Protocol)/RLC(Radio Link Control)/MAC/PHY) and UE. The gNBs are interconnected through a Xn interface. The gNB, in addition, is connected to an NGC(New Generation Core) through an NG interface. In more detail, the gNB is connected to an AMF(Access and Mobility Management Function) through an N2 interface, and is connected to a UPF(User Plane Function) through an N3 interface.

Figure 2:
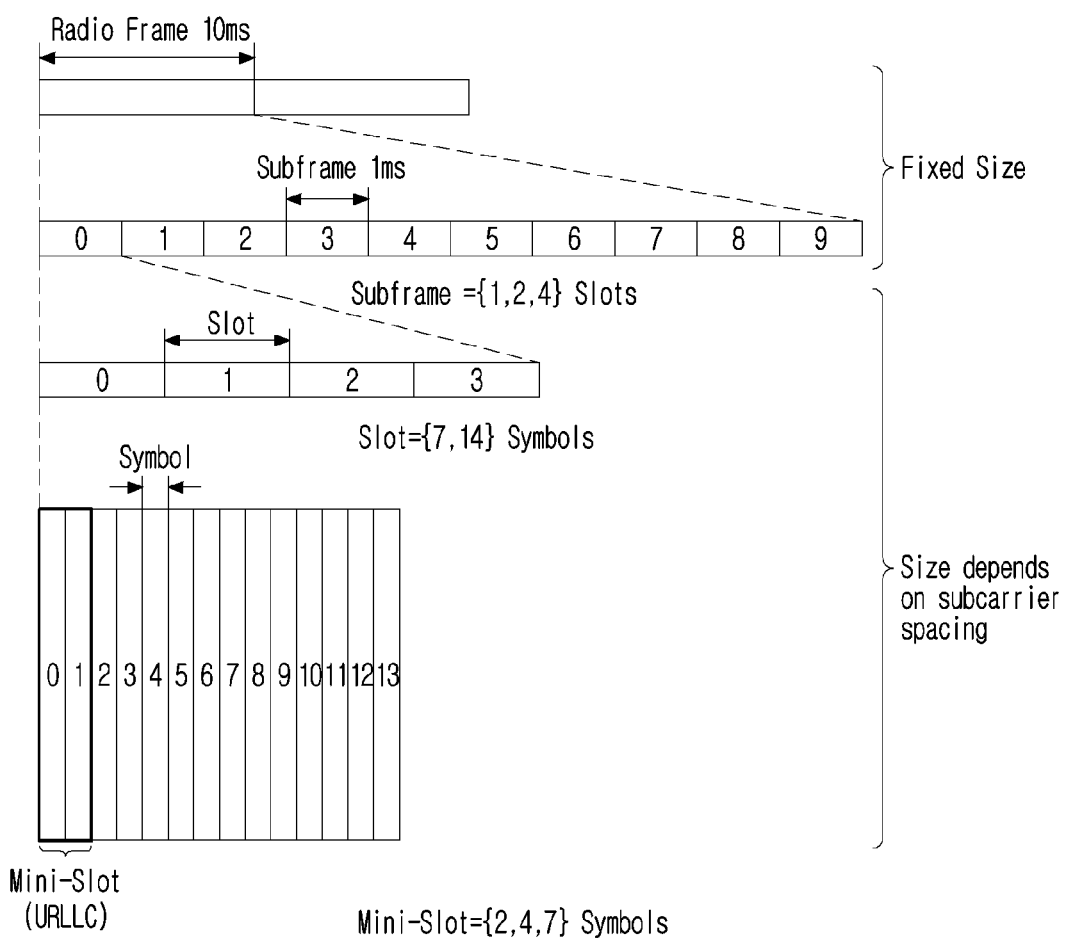
FIG. 2 illustrates a frame structure in a wireless communication system to which the present disclosure may be applied.

FIG. 2 illustrates a frame structure in a wireless communication system to which the present disclosure may be applied.

A NR system may support a plurality of numerologies. Here, a numerology may be defined by a subcarrier spacing and a cyclic prefix (CP) overhead. Here, a plurality of subcarrier spacings may be derived by scaling a basic (reference) subcarrier spacing by an integer N (or, μ). In addition, although it is assumed that a very low subcarrier spacing is not used in a very high carrier frequency, a used numerology may be selected independently from a frequency band. In addition, a variety of frame structures according to a plurality of numerologies may be supported in a NR system.

Hereinafter, an OFDM numerology and frame structure which may be considered in a NR system will be described. A plurality of OFDM numerologies supported in a NR system may be defined as in the following Table 1.

TABLE 1

| μ | $\Delta f = 2^\mu \cdot 15$ [kHz] | CP |
|---|---|---|
| 0 | 15 | Normal |
| 1 | 30 | Normal |
| 2 | 60 | Normal, |

TABLE 1-continued

| μ | Δf = $2^μ \cdot 15$ [kHz] | CP |
|---|---|---|
|  |  | Extended |
| 3 | 120 | Normal |
| 4 | 240 | Normal |

NR supports a plurality of numerologies (or subcarrier spacings (SCS)) for supporting a variety of 5G services. For example, when a SCS is 15 kHz, a wide area in traditional cellular bands is supported, and when a SCS is 30 kHz/60 kHz, dense-urban, lower latency and a wider carrier bandwidth are supported, and when a SCS is 60 kHz or higher, a bandwidth wider than 24.25 GHz is supported to overcome a phase noise. An NR frequency band is defined as a frequency range in two types (FR1, FR2). FR1, FR2 may be configured as in the following Table 2. In addition, FR2 may mean a millimeter wave (mmW).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Regarding a frame structure in an NR system, a size of a variety of fields in a time domain is expresses as a multiple of a time unit of $T_c=1/(\Delta f_{max} \cdot N_f)$. Here, $\Delta f_{max}$ is $480 \cdot 10^3$ Hz and $N_f$ is 4096. Downlink and uplink transmission is configured (organized) with a radio frame having a duration of $T_f=1/(\Delta f_{max} N_f/100) \cdot T_c=10$ ms. Here, a radio frame is configured with 10 subframes having a duration of $T_{sf}=(\Delta f_{max} N_f/1000) \cdot T_c=1$ ms, respectively. In this case, there may be one set of frames for an uplink and one set of frames for a downlink. In addition, transmission in an uplink frame No. i from a terminal should start earlier by $T_{TA}=(N_{TA}+N_{TA,offset})T_c$ than a corresponding downlink frame in a corresponding terminal starts. For a subcarrier spacing configuration p, slots are numbered in an increasing order of $n_s^μ \in \{0, \ldots, N_{slot}^{subframe,μ}-1\}$ in a subframe and are numbered in an increasing order of $n_{s,f}^μ \in \{0, \ldots, N_{slot}^{frame,μ}-1\}$ in a radio frame. One slot is configured with $N_{symb}^{slot}$ consecutive OFDM symbols and $N_{symb}^{slot}$ is determined according to CP. A start of a slot $n_s^μ$ in a subframe is temporally arranged with a start of an OFDM symbol $n_s^μ N_{symb}^{slot}$ in the same subframe. All terminals may not perform transmission and reception at the same time, which means that all OFDM symbols of a downlink slot or an uplink slot may not be used. Table 3 represents the number of OFDM symbols per slot ($N_{symb}^{slot}$), the number of slots per radio frame ($N_{slot}^{frame,μ}$) and the number of slots per subframe ($N_{slot}^{subframe,μ}$) in a normal CP and Table 4 represents the number of OFDM symbols per slot, the number of slots per radio frame and the number of slots per subframe in an extended CP.

TABLE 3

| μ | $N_{symb}^{slot}$ | $N_{slot}^{frame,μ}$ | $N_{slot}^{subframe,μ}$ |
|---|---|---|---|
| 0 | 14 | 10 | 1 |
| 1 | 14 | 20 | 2 |
| 2 | 14 | 40 | 4 |

TABLE 3-continued

| μ | $N_{symb}^{slot}$ | $N_{slot}^{frame,μ}$ | $N_{slot}^{subframe,μ}$ |
|---|---|---|---|
| 3 | 14 | 80 | 8 |
| 4 | 14 | 160 | 16 |

TABLE 41

| μ | $N_{symb}^{slot}$ | $N_{slot}^{frame,μ}$ | $N_{slot}^{subframe,μ}$ |
|---|---|---|---|
| 2 | 12 | 40 | 4 |

FIG. 2 is an example on μ=2 (SCS is 60 kHz), 1 subframe may include 4 slots referring to Table 3. 1 subframe={1,2,4} slot shown in FIG. 2 is an example, the number of slots which may be included in 1 subframe is defined as in Table 3 or Table 4. In addition, a mini-slot may include 2, 4 or 7 symbols or more or less symbols. Regarding a physical resource in a NR system, an antenna port, a resource grid, a resource element, a resource block, a carrier part, etc. may be considered. Hereinafter, the physical resources which may be considered in an NR system will be described in detail.

First, in relation to an antenna port, an antenna port is defined so that a channel where a symbol in an antenna port is carried can be inferred from a channel where other symbol in the same antenna port is carried. When a large-scale property of a channel where a symbol in one antenna port is carried may be inferred from a channel where a symbol in other antenna port is carried, it may be said that 2 antenna ports are in a QC/QCL(quasi co-located or quasi co-location) relationship. In this case, the large-scale property includes at least one of delay spread, doppler spread, frequency shift, average received power, received timing.

Figure 3:
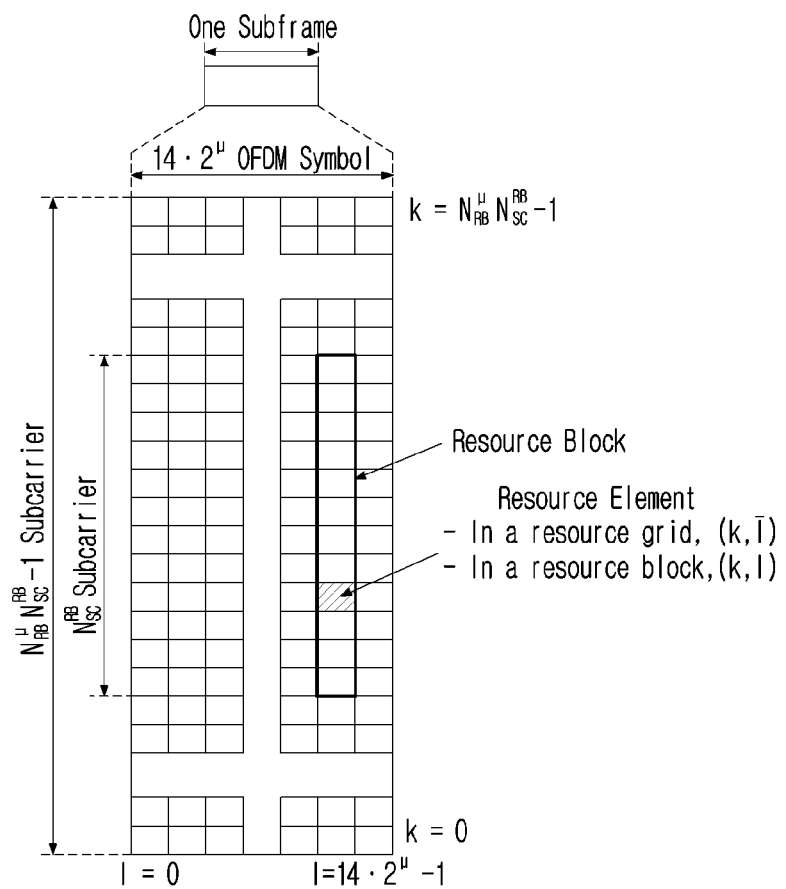
FIG. 3 illustrates a resource grid in a wireless communication system to which the present disclosure may be applied.

FIG. 3 illustrates a resource grid in a wireless communication system to which the present disclosure may be applied.

In reference to FIG. 3, it is illustratively described that a resource grid is configured with $N_{RB}^μ N_{sc}^{RB}$ subcarriers in a frequency domain and one subframe is configured with $14 \cdot 2^μ$ OFDM symbols, but it is not limited thereto. In an NR system, a transmitted signal is described by OFDM symbols of $2^μ N_{symb}^{(μ)}$ and one or more resource grids configured with $N_{RB}^μ N_{sc}^{RB}$ subcarriers. Here, $N_{RB}^μ \leq N_{RB}^{max,μ}$. The $N_{RB}^{max,μ}$ represents a maximum transmission bandwidth, which may be different between an uplink and a downlink as well as between numerologies. In this case, one resource grid may be configured per p and antenna port p. Each element of a resource grid for p and an antenna port p is referred to as a resource element and is uniquely identified by an index pair (k,l'). Here, k=0, . . . , $N_{RB}^μ N_{sc}^{RB}-1$ is an index in a frequency domain and l'=0, . . . , $2^μ N_{symb}^{(μ)}-1$ refers to a position of a symbol in a subframe. When referring to a resource element in a slot, an index pair (k,l) is used. Here, l=0, . . . , $N_{symb}^μ-1$. A resource element (k,l') for μ and an antenna port p corresponds to a complex value, $a_{k,l'}^{(p,μ)}$. When there is no risk of confusion or when a specific antenna port or numerology is not specified, indexes p and p may be dropped, whereupon a complex value may be $a_{k,l'}^{(p)}$ or $a_{k,l'}$. In addition, a resource block (RB) is defined as $N_{sc}^{RB}=12$ consecutive subcarriers in a frequency domain.

Point A plays a role as a common reference point of a resource block grid and is obtained as follows.

offsetToPointA for a primary cell (PCell) downlink represents a frequency offset between point A and the lowest subcarrier of the lowest resource block overlapped with a SS/PBCH block which is used by a terminal for an initial cell selection. It is expressed in resource block units assuming a 15 kHz subcarrier spacing for FR1 and a 60 kHz subcarrier spacing for FR2.

absoluteFrequencyPointA represents a frequency-position of point A expressed as in ARFCN (absolute radio-frequency channel number).

Common resource blocks are numbered from 0 to the top in a frequency domain for a subcarrier spacing configuration μ. The center of subcarrier 0 of common resource block 0 for a subcarrier spacing configuration μ is identical to 'point A'. A relationship between a common resource block number $n_{CRB}^{\mu}$ and a resource element (k,l) for a subcarrier spacing configuration μ in a frequency domain is given as in the following Equation 1.

$$n_{CRB}^{\mu} = \left\lfloor \frac{k}{N_{sc}^{RB}} \right\rfloor \quad \text{[Equation 1]}$$

In Equation 1, k is defined relatively to point A so that k=0 corresponds to a subcarrier centering in point A. Physical resource blocks are numbered from 0 to $N_{BWP,i}^{size,\mu}-1$ in a bandwidth part (BWP) and i is a number of a BWP. A relationship between a physical resource block $n_{PRB}$ and a common resource block $n_{CRB}$ in BWP i is given by the following Equation 2.

$$n_{CRB}^{\mu} = n_{PRB}^{\mu} + N_{BWP,i}^{start,\mu} \quad \text{[Equation 2]}$$

$N_{BWP}^{start,\mu}$ is a common resource block that a BWP starts relatively to common resource block 0.

Figure 4:
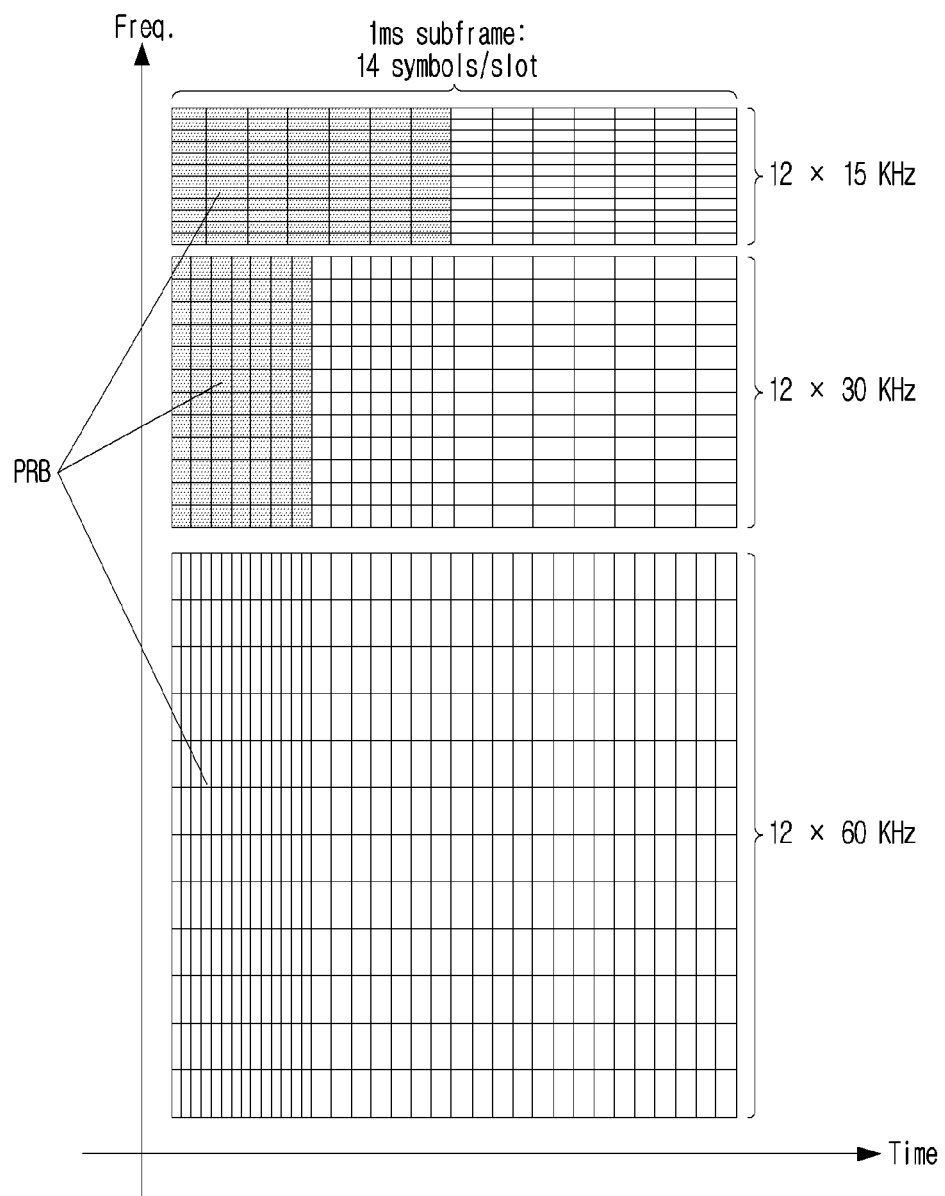
FIG. 4 illustrates a physical resource block in a wireless communication system to which the present disclosure may be applied.

FIG. 4 illustrates a physical resource block in a wireless communication system to which the present disclosure may be applied. And, FIG. 5 illustrates a slot structure in a wireless communication system to which the present disclosure may be applied.

Figure 5:
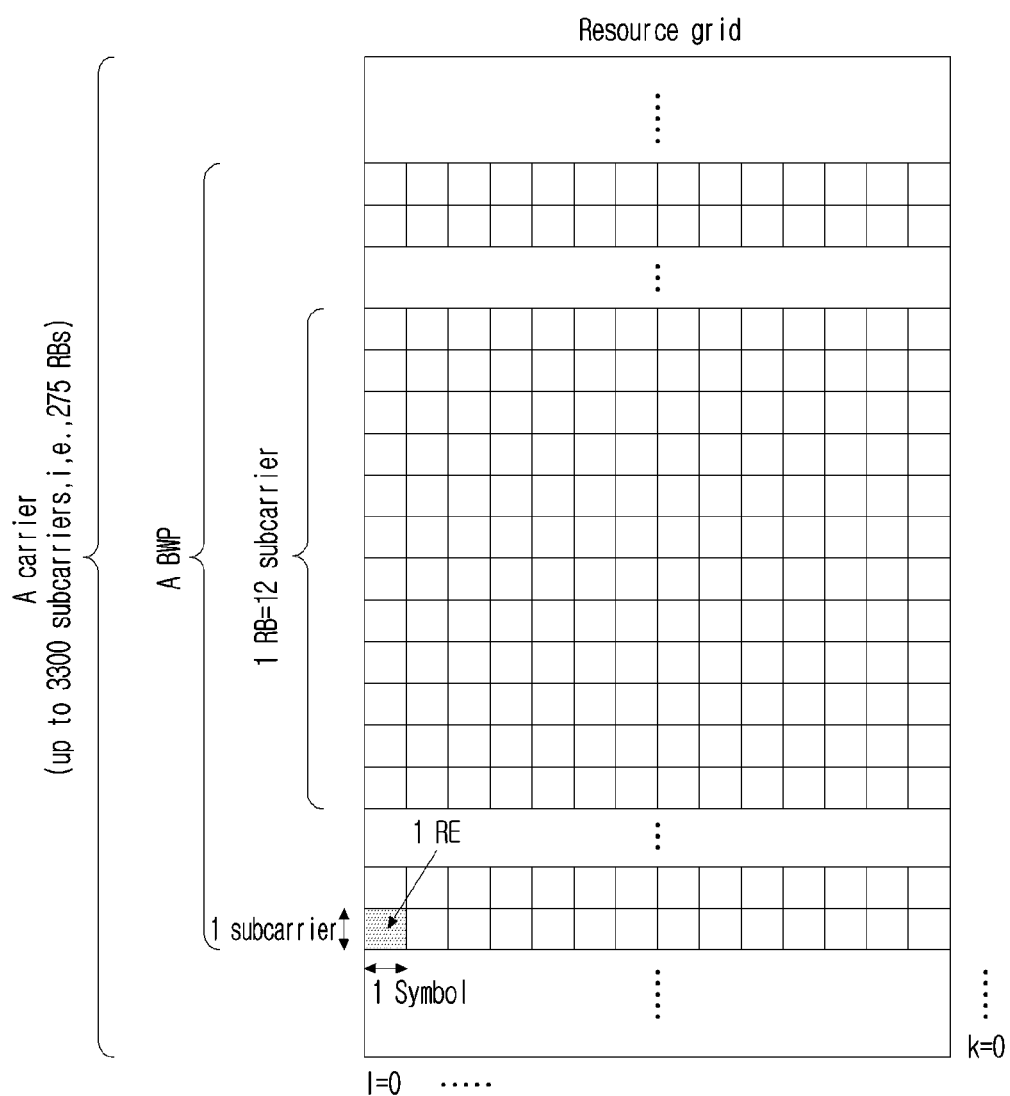
FIG. 5 illustrates a slot structure in a wireless communication system to which the present disclosure may be applied.

In reference to FIG. 4 and FIG. 5, a slot includes a plurality of symbols in a time domain. For example, for a normal CP, one slot includes 7 symbols, but for an extended CP, one slot includes 6 symbols.

A carrier includes a plurality of subcarriers in a frequency domain. An RB (Resource Block) is defined as a plurality of (e.g., 12) consecutive subcarriers in a frequency domain. A BWP(Bandwidth Part) is defined as a plurality of consecutive (physical) resource blocks in a frequency domain and may correspond to one numerology (e.g., an SCS, a CP length, etc.). A carrier may include a maximum N (e.g., 5) BWPs. A data communication may be performed through an activated BWP and only one BWP may be activated for one terminal. In a resource grid, each element is referred to as a resource element (RE) and one complex symbol may be mapped.

In an NR system, up to 400 MHz may be supported per component carrier (CC). If a terminal operating in such a wideband CC always operates turning on a radio frequency (FR) chip for the whole CC, terminal battery consumption may increase. Alternatively, when several application cases operating in one wideband CC (e.g., eMBB, URLLC, Mmtc, V2X, etc.) are considered, a different numerology (e.g., a subcarrier spacing, etc.) may be supported per frequency band in a corresponding CC. Alternatively, each terminal may have a different capability for the maximum bandwidth. By considering it, a base station may indicate a terminal to operate only in a partial bandwidth, not in a full bandwidth of a wideband CC, and a corresponding partial bandwidth is defined as a bandwidth part (BWP) for convenience. A BWP may be configured with consecutive RBs on a frequency axis and may correspond to one numerology (e.g., a subcarrier spacing, a CP length, a slot/a mini-slot duration).

Meanwhile, a base station may configure a plurality of BWPs even in one CC configured to a terminal. For example, a BWP occupying a relatively small frequency domain may be configured in a PDCCH monitoring slot, and a PDSCH indicated by a PDCCH may be scheduled in a greater BWP. Alternatively, when UEs are congested in a specific BWP, some terminals may be configured with other BWP for load balancing. Alternatively, considering frequency domain inter-cell interference cancellation between neighboring cells, etc., some middle spectrums of a full bandwidth may be excluded and BWPs on both edges may be configured in the same slot. In other words, a base station may configure at least one DL/UL BWP to a terminal associated with a wideband CC. A base station may activate at least one DL/UL BWP of configured DL/UL BWP(s) at a specific time (by L1 signaling or MAC CE(Control Element) or RRC signaling, etc.). In addition, a base station may indicate switching to other configured DL/UL BWP (by L1 signaling or MAC CE or RRC signaling, etc.). Alternatively, based on a timer, when a timer value is expired, it may be switched to a determined DL/UL BWP. Here, an activated DL/UL BWP is defined as an active DL/UL BWP. But, a configuration on a DL/UL BWP may not be received when a terminal performs an initial access procedure or before a RRC connection is set up, so a DL/UL BWP which is assumed by a terminal under these situations is defined as an initial active DL/UL BWP.

Figure 6:
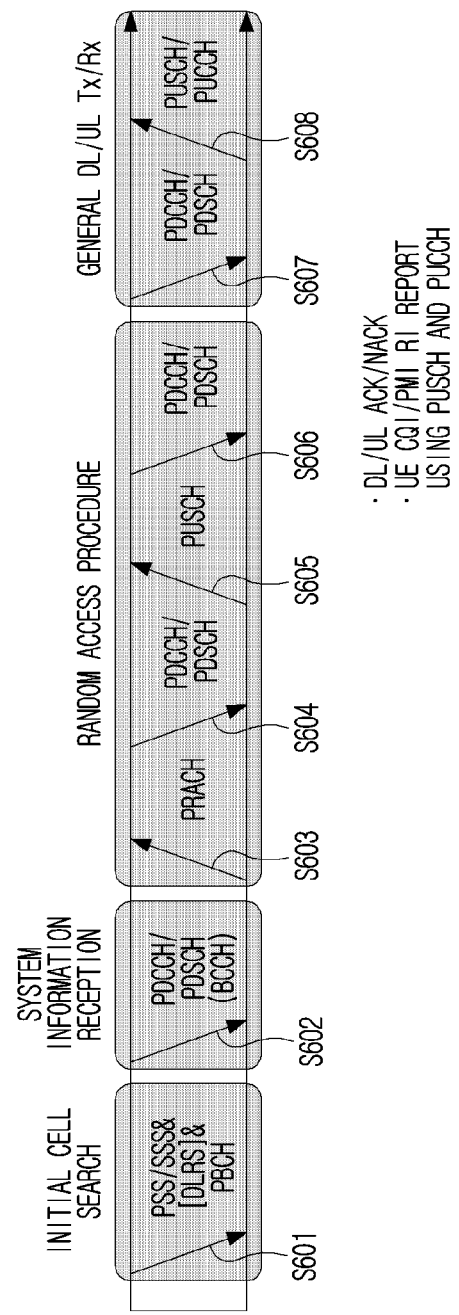
FIG. 6 illustrates physical channels used in a wireless communication system to which the present disclosure may be applied and a general signal transmission and reception method using them.

FIG. 6 illustrates physical channels used in a wireless communication system to which the present disclosure may be applied and a general signal transmission and reception method using them.

In a wireless communication system, a terminal receives information through a downlink from a base station and transmits information through an uplink to a base station. Information transmitted and received by a base station and a terminal includes data and a variety of control information and a variety of physical channels exist according to a type/a usage of information transmitted and received by them.

When a terminal is turned on or newly enters a cell, it performs an initial cell search including synchronization with a base station or the like (S601). For the initial cell search, a terminal may synchronize with a base station by receiving a primary synchronization signal (PSS) and a secondary synchronization signal (SSS) from a base station and obtain information such as a cell identifier (ID), etc. After that, a terminal may obtain broadcasting information in a cell by receiving a physical broadcast channel (PBCH) from a base station. Meanwhile, a terminal may check out a downlink channel state by receiving a downlink reference signal (DL RS) at an initial cell search stage.

A terminal which completed an initial cell search may obtain more detailed system information by receiving a physical downlink control channel (PDCCH) and a physical downlink shared channel (PDSCH) according to information carried in the PDCCH (S602).

Meanwhile, when a terminal accesses to a base station for the first time or does not have a radio resource for signal transmission, it may perform a random access (RACH) procedure to a base station (S603 to S606). For the random access procedure, a terminal may transmit a specific sequence as a preamble through a physical random access channel (PRACH) (S603 and S605) and may receive a response message for a preamble through a PDCCH and a corresponding PDSCH (S604 and S606). A contention based RACH may additionally perform a contention resolution procedure.

A terminal which performed the above-described procedure subsequently may perform PDCCH/PDSCH reception (S607) and PUSCH(Physical Uplink Shared Channel)/PUCCH(physical uplink control channel) transmission (S608) as a general uplink/downlink signal transmission procedure. In particular, a terminal receives downlink control information (DCI) through a PDCCH. Here, DCI includes control information such as resource allocation information for a terminal and a format varies depending on its purpose of use.

Meanwhile, control information which is transmitted by a terminal to a base station through an uplink or is received by a terminal from a base station includes a downlink/uplink ACK/NACK(Acknowledgement/Non-Acknowledgement) signal, a CQI(Channel Quality Indicator), a PMI(Precoding Matrix Indicator), a RI(Rank Indicator), etc. For a 3GPP LTE system, a terminal may transmit control information of the above-described CQI/PMI/RI, etc. through a PUSCH and/or a PUCCH.

Table 5 represents an example of a DCI format in an NR system.

TABLE 5

| DCI Format | Use |
|---|---|
| 0_0 | Scheduling of a PUSCH in one cell |
| 0_1 | Scheduling of one or multiple PUSCHs in one cell, or indication of cell group downlink feedback information to a UE |
| 0_2 | Scheduling of a PUSCH in one cell |
| 1_0 | Scheduling of a PDSCH in one DL cell |
| 1_1 | Scheduling of a PDSCH in one cell |
| 1_2 | Scheduling of a PDSCH in one cell |

In reference to Table 5, DCI formats 0_0, 0_1 and 0_2 may include resource information (e.g., UL/SUL(Supplementary UL), frequency resource allocation, time resource allocation, frequency hopping, etc.), information related to a transport block(TB) (e.g., MCS(Modulation Coding and Scheme), a NDI(New Data Indicator), a RV(Redundancy Version), etc.), information related to a HARQ(Hybrid—Automatic Repeat and request) (e.g., a process number, a DAI(Downlink Assignment Index), PDSCH-HARQ feedback timing, etc.), information related to multiple antennas (e.g., DMRS sequence initialization information, an antenna port, a CSI request, etc.), power control information (e.g., PUSCH power control, etc.) related to scheduling of a PUSCH and control information included in each DCI format may be pre-defined. DCI format 0_0 is used for scheduling of a PUSCH in one cell. Information included in DCI format 0_0 is CRC (cyclic redundancy check) scrambled by a C-RNTI(Cell Radio Network Temporary Identifier) or a CS-RNTI(Configured Scheduling RNTI) or a MCS-C-RNTI(Modulation Coding Scheme Cell RNTI) and transmitted.

DCI format 0_1 is used to indicate scheduling of one or more PUSCHs or configure grant (CG) downlink feedback information to a terminal in one cell. Information included in DCI format 0_1 is CRC scrambled by a C-RNTI or a CS-RNTI or a SP-CSI-RNTI(Semi-Persistent CSI RNTI) or a MCS-C-RNTI and transmitted.

DCI format 0_2 is used for scheduling of a PUSCH in one cell. Information included in DCI format 0_2 is CRC scrambled by a C-RNTI or a CS-RNTI or a SP-CSI-RNTI or a MCS-C-RNTI and transmitted.

Next, DCI formats 1_0, 1_1 and 1_2 may include resource information (e.g., frequency resource allocation, time resource allocation, VRB(virtual resource block)-PRB (physical resource block) mapping, etc.), information related to a transport block(TB) (e.g., MCS, NDI, RV, etc.), information related to a HARQ (e.g., a process number, DAI, PDSCH-HARQ feedback timing, etc.), information related to multiple antennas (e.g., an antenna port, a TCI(transmission configuration indicator), a SRS(sounding reference signal) request, etc.), information related to a PUCCH (e.g., PUCCH power control, a PUCCH resource indicator, etc.) related to scheduling of a PDSCH and control information included in each DCI format may be pre-defined.

DCI format 1_0 is used for scheduling of a PDSCH in one DL cell. Information included in DCI format 1_0 is CRC scrambled by a C-RNTI or a CS-RNTI or a MCS-C-RNTI and transmitted.

DCI format 1_1 is used for scheduling of a PDSCH in one cell. Information included in DCI format 1_1 is CRC scrambled by a C-RNTI or a CS-RNTI or a MCS-C-RNTI and transmitted.

DCI format 1_2 is used for scheduling of a PDSCH in one cell. Information included in DCI format 1_2 is CRC scrambled by a C-RNTI or a CS-RNTI or a MCS-C-RNTI and transmitted.

CSI-Related Operation

In an NR (New Radio) system, a CSI-RS(channel state information-reference signal) is used for time and/or frequency tracking, CSI computation, L1(layer 1)-RSRP(reference signal received power) computation and mobility. Here, CSI computation is related to CSI acquisition and L1-RSRP computation is related to beam management (BM).

CSI(channel state information) collectively refers to information which may represent quality of a radio channel (or also referred to as a link) formed between a terminal and an antenna port.

To perform one of the usages of a CSI-RS, a terminal (e.g., user equipment, UE) receives configuration information related to CSI from a base station (e.g., general Node B, gNB) through RRC(radio resource control) signaling.

The configuration information related to CSI may include at least one of information related to a CSI-IM (interference management) resource, information related to CSI measurement configuration, information related to CSI resource configuration, information related to a CSI-RS resource or information related to CSI report configuration.

i) Information related to a CSI-IM resource may include CSI-IM resource information, CSI-IM resource set information, etc. A CSI-IM resource set is identified by a CSI-IM resource set ID (identifier) and one resource set includes at least one CSI-IM resource. Each CSI-IM resource is identified by a CSI-IM resource ID.

ii) Information related to CSI resource configuration may be expressed as CSI-ResourceConfig IE. Information related to a CSI resource configuration defines a group which includes at least one of an NZP (non zero power) CSI-RS resource set, a CSI-IM resource set or a CSI-SSB resource set. In other words, the information related to a CSI resource configuration may include a CSI-RS resource set list and the CSI-RS resource set list may include at least one of a NZP CSI-RS resource set list, a CSI-IM resource set list or a CSI-SSB resource set list. A CSI-RS resource set is identified by a CSI-RS resource set ID and one resource set includes at least one CSI-RS resource. Each CSI-RS resource is identified by a CSI-RS resource ID.

Parameters representing a usage of a CSI-RS (e.g., a 'repetition' parameter related to BM, a 'trs-Info' parameter related to tracking) may be configured per NZP CSI-RS resource set.

iii) Information related to a CSI report configuration includes a report configuration type (reportConfigType) parameter representing a time domain behavior and a report quantity (reportQuantity) parameter representing CSI-related quantity for a report. The time domain behavior may be periodic, aperiodic or semi-persistent.

A terminal measures CSI based on the configuration information related to CSI.

The CSI measurement may include (1) a process in which a terminal receives a CSI-RS and (2) a process in which CSI is computed through a received CSI-RS and detailed description thereon is described after.

For a CSI-RS, RE(resource element) mapping of a CSI-RS resource in a time and frequency domain is configured by higher layer parameter CSI-RS-ResourceMapping.

A terminal reports the measured CSI to a base station.

In this case, when quantity of CSI-ReportConfig is configured as 'none (or No report)', the terminal may omit the report. But, although the quantity is configured as 'none (or No report)', the terminal may perform a report to a base station. When the quantity is configured as 'none', an aperiodic TRS is triggered or repetition is configured. In this case, only when repetition is configured as 'ON', a report of the terminal may be omitted.

CSI Measurement

An NR system supports more flexible and dynamic CSI measurement and reporting. Here, the CSI measurement may include a procedure of receiving a CSI-RS and acquiring CSI by computing a received CSI-RS.

As a time domain behavior of CSI measurement and reporting, aperiodic/semi-persistent/periodic CM (channel measurement) and IM (interference measurement) are supported. 4-port NZP CSI-RS RE pattern is used for CSI-IM configuration.

CSI-IM based IMR of NR has a design similar to CSI-IM of LTE and is configured independently from ZP CSI-RS resources for PDSCH rate matching. In addition, each port emulates an interference layer having (a desirable channel and) a precoded NZP CSI-RS in NZP CSI-RS-based IMR. As it is about intra-cell interference measurement for a multi-user case, MU interference is mainly targeted.

A base station transmits a precoded NZP CSI-RS to a terminal in each port of configured NZP CSI-RS based IMR.

A terminal assumes a channel/interference layer and measures interference for each port in a resource set.

When there is no PMI and RI feedback for a channel, a plurality of resources are configured in a set and a base station or a network indicates a subset of NZP CSI-RS resources through DCI for channel/interference measurement.

A resource setting and a resource setting configuration are described in more detail.

Resource Setting

Each CSI resource setting 'CSI-ResourceConfig' includes a configuration for a S≥1 CSI resource set (given by a higher layer parameter csi-RS-ResourceSetList). A CSI resource setting corresponds to CSI-RS-resourcesetlist. Here, S represents the number of configured CSI-RS resource sets. Here, a configuration for a S≥1 CSI resource set includes each CSI resource set including CSI-RS resources (configured with a NZP CSI-RS or CSI-IM) and a SS/PBCH block (SSB) resource used for L1-RSRP computation.

Each CSI resource setting is positioned at a DL BWP (bandwidth part) identified by a higher layer parameter bwp-id. In addition, all CSI resource settings linked to a CSI reporting setting have the same DL BWP.

A time domain behavior of a CSI-RS resource in a CSI resource setting included in a CSI-ResourceConfig IE may be indicated by a higher layer parameter resourceType and may be configured to be aperiodic, periodic or semi-persistent. For a periodic and semi-persistent CSI resource setting, the number (S) of configured CSI-RS resource sets is limited to '1'. For a periodic and semi-persistent CSI resource setting, configured periodicity and a slot offset are given by a numerology of an associated DL BWP as given by bwp-id.

When UE is configured with a plurality of CSI-ResourceConfigs including the same NZP CSI-RS resource ID, the same time domain behavior is configured for CSI-ResourceConfig.

When UE is configured with a plurality of CSI-ResourceConfigs including the same CSI-IM resource ID, the same time domain behavior is configured for CSI-ResourceConfig.

One or more CSI resource settings for channel measurement (CM) and interference measurement (IM) are configured through higher layer signaling as follows.

CSI-IM resource for interference measurement
NZP CSI-RS resource for interference measurement
NZP CSI-RS resource for channel measurement In other words, a CMR (channel measurement resource) may be a NZP CSI-RS for CSI acquisition and an IMR (Interference measurement resource) may be a NZP CSI-RS for CSI-IM and IM.

In this case, CSI-IM(or a ZP CSI-RS for IM) is mainly used for inter-cell interference measurement.

In addition, an NZP CSI-RS for IM is mainly used for intra-cell interference measurement from multi-users.

UE may assume that CSI-RS resource(s) for channel measurement and CSI-IM/NZP CSI-RS resource(s) for interference measurement configured for one CSI reporting are 'QCL-TypeD' per resource.

Resource Setting Configuration

As described, a resource setting may mean a resource set list.

For aperiodic CSI, each trigger state configured by using a higher layer parameter CSI-AperiodicTriggerState is associated with one or a plurality of CSI-ReportConfigs that each CSI-ReportConfig is linked to a periodic, semi-persistent or aperiodic resource setting.

One reporting setting may be connected to up to 3 resource settings.

When one resource setting is configured, a resource setting (given by a higher layer parameter resourcesForChannelMeasurement) is about channel measurement for L1-RSRP computation.

When two resource settings are configured, a first resource setting (given by a higher layer parameter resourcesForChannelMeasurement) is for channel measurement and a second resource setting (given by csi-IM-ResourcesForInterference or nzp-CSI-RS-ResourcesForInterference) is for interference measurement performed in CSI-IM or a NZP CSI-RS.

When three resource settings are configured, a first resource setting (given by resourcesForChannelMeasurement) is for channel measurement, a second resource setting (given by csi-IM-ResourcesForInterference) is for CSI-IM based interference measurement and a third resource setting (given by nzp-CSI-RS-ResourcesForInterference) is for NZP CSI-RS based interference measurement.

For semi-persistent or periodic CSI, each CSI-ReportConfig is linked to a periodic or semi-persistent resource setting.

When one resource setting (given by resourcesForChannelMeasurement) is configured, the resource setting is about channel measurement for L1-RSRP computation.

When two resource settings are configured, a first resource setting (given by resourcesForChannelMeasurement) is for channel measurement and a second resource setting (given by a higher layer parameter csi-IM-ResourcesForInterference) is used for interference measurement performed in CSI-IM.

CSI Computation

When interference measurement is performed in CSI-IM, each CSI-RS resource for channel measurement is associated with a CSI-IM resource per resource in an order of CSI-RS resources and CSI-IM resources in a corresponding resource set. The number of CSI-RS resources for channel measurement is the same as the number of CSI-IM resources.

In addition, when interference measurement is performed in an NZP CSI-RS, UE does not expect to be configured with one or more NZP CSI-RS resources in an associated resource set in a resource setting for channel measurement.

A terminal configured with a higher layer parameter nzp-CSI-RS-ResourcesForInterference does not expect that 18 or more NZP CSI-RS ports will be configured in a NZP CSI-RS resource set.

For CSI measurement, a terminal assumes the followings.
Each NZP CSI-RS port configured for interference measurement corresponds to an interference transmission layer.
All interference transmission layers of an NZP CSI-RS port for interference measurement consider EPRE (energy per resource element) ratio.
A different interference signal in RE(s) of an NZP CSI-RS resource for channel measurement, an NZP CSI-RS resource for interference measurement or a CSI-IM resource for interference measurement CSI Report For a CSI report, a time and frequency resource which may be used by UE are controlled by a base station.

CSI(channel state information) may include at least one of a channel quality indicator(CQI), a precoding matrix indicator(PMI), a CSI-RS resource indicator (CRI), a SS/PBCH block resource indicator (SSBRI), a layer indicator (LI), a rank indicator (RI) or L1-RSRP.

For CQI, PMI, CRI, SSBRI, LI, RI, L1-RSRP, a terminal is configured by a higher layer with N≥1 CSI-ReportConfig reporting setting, M≥1 CSI-ResourceConfig resource setting and a list of one or two trigger states (provided by aperiodicTriggerStateList and semiPersistentOnPUSCH-TriggerStateList). Each trigger state in the aperiodicTriggerStateList includes a associated CSI-ReportConfigs list which indicates a channel and optional resource set IDs for interference. In semiPersistentOnPUSCH-TriggerStateList, one associated CSI-ReportConfig is included in each trigger state.

In addition, a time domain behavior of CSI reporting supports periodic, semi-persistent, aperiodic.

i) Periodic CSI reporting is performed in a short PUCCH, a long PUCCH. Periodicity and a slot offset of periodic CSI reporting may be configured by RRC and refers to a CSI-ReportConfig IE.

ii) SP(semi-periodic) CSI reporting is performed in a short PUCCH, a long PUCCH, or a PUSCH.

For SP CSI in a short/long PUCCH, periodicity and a slot offset are configured by RRC and a CSI report is activated/deactivated by separate MAC CE/DCI.

For SP CSI in a PUSCH, periodicity of SP CSI reporting is configured by RRC, but a slot offset is not configured by RRC and SP CSI reporting is activated/deactivated by DCI(format 0_1). For SP CSI reporting in a PUSCH, a separated RNTI(SP-CSI C-RNTI) is used.

An initial CSI report timing follows a PUSCH time domain allocation value indicated by DCI and a subsequent CSI report timing follows a periodicity configured by RRC.

DCI format 0_1 may include a CSI request field and activate/deactivate a specific configured SP-CSI trigger state. SP CSI reporting has activation/deactivation equal or similar to a mechanism having data transmission in a SPS PUSCH.

iii) Aperiodic CSI reporting is performed in a PUSCH and is triggered by DCI. In this case, information related to trigger of aperiodic CSI reporting may be delivered/indicated/configured through MAC-CE.

For AP CSI having an AP CSI-RS, AP CSI-RS timing is configured by RRC and timing for AP CSI reporting is dynamically controlled by DCI.

In NR, a method of dividing and reporting CSI in a plurality of reporting instances applied to a PUCCH based CSI report in LTE (e.g., transmitted in an order of RI, WB PMI/CQI, SB PMI/CQI) is not applied. Instead, in NR, there is a limit that a specific CSI report is not configured in a short/long PUCCH and a CSI omission rule is defined. In addition, regarding AP CSI reporting timing, a PUSCH symbol/slot location is dynamically indicated by DCI. In addition, candidate slot offsets are configured by RRC. For CSI reporting, a slot offset(Y) is configured per reporting setting. For UL-SCH, a slot offset K2 is separately configured.

2 CSI latency classes (low latency class, high latency class) are defined with regard to CSI computation complexity. Low latency CSI is WB CSI which includes up to 4 ports Type-I codebooks or up to 4 ports non-PMI feedback CSI. High latency CSI refers to CSI other than low latency CSI. For a normal terminal, (Z, Z') is defined in a unit of OFDM symbols. Here, Z represents the minimum CSI processing time until a CSI report is performed after receiving aperiodic CSI triggering DCI. In addition, Z' refers to the minimum CSI processing time until a CSI report is performed after receiving a CSI-RS for a channel/interference.

Additionally, a terminal reports the number of CSI which may be calculated at the same time.

Quasi-Co Locaton (QCL)

An antenna port is defined so that a channel where a symbol in an antenna port is transmitted can be inferred from a channel where other symbol in the same antenna port is transmitted. When a property of a channel where a symbol in one antenna port is carried may be inferred from a channel where a symbol in other antenna port is carried, it may be said that 2 antenna ports are in a QC/QCL(quasi co-located or quasi co-location) relationship.

Here, the channel property includes at least one of delay spread, doppler spread, frequency/doppler shift, average received power, received timing/average delay, or a spatial RX parameter. Here, a spatial Rx parameter means a spatial (Rx) channel property parameter such as an angle of arrival.

A terminal may be configured at list of up to M TCI-State configurations in a higher layer parameter PDSCH-Config to decode a PDSCH according to a detected PDCCH having intended DCI for a corresponding terminal and a given serving cell. The M depends on UE capability.

Each TCI-State includes a parameter for configuring a quasi co-location relationship between ports of one or two DL reference signals and a DM-RS(demodulation reference signal) of a PDSCH.

A quasi co-location relationship is configured by a higher layer parameter qcl-Type1 for a first DL RS and qcl-Type2 for a second DL RS (if configured). For two DL RSs, a QCL type is not the same regardless of whether a reference is a same DL RS or a different DL RS.

A QCL type corresponding to each DL RS is given by a higher layer parameter qcl-Type of QCL-Info and may take one of the following values.
 'QCL-TypeA': {Doppler shift, Doppler spread, average delay, delay spread}
 'QCL-TypeB': {Doppler shift, Doppler spread}
 'QCL-TypeC': {Doppler shift, average delay}
 'QCL-TypeD': {Spatial Rx parameter}

For example, when a target antenna port is a specific NZP CSI-RS, it may be indicated/configured that a corresponding NZP CSI-RS antenna port is quasi-colocated with a specific TRS with regard to QCL-Type A and is quasi-colocated with a specific SSB with regard to QCL-Type D. A terminal received such indication/configuration may receive a corresponding NZP CSI-RS by using a doppler, delay value measured in a QCL-TypeA TRS and apply a Rx beam used for receiving QCL-TypeD SSB to reception of a corresponding NZP CSI-RS.

UE may receive an activation command by MAC CE signaling used to map up to 8 TCI states to a codepoint of a DCI field 'Transmission Configuration Indication'.

When HARQ-ACK corresponding to a PDSCH carrying an activation command is transmitted in a slot n, mapping indicated between a TCI state and a codepoint of a DCI field 'Transmission Configuration Indication' may be applied by starting from a slot $n+3N_{slot}^{subframe,\mu}+1$. After UE receives an initial higher layer configuration for TCI states before receiving an activation command, UE may assume for QCL-TypeA, and if applicable, for QCL-TypeD that a DMRS port of a PDSCH of a serving cell is quasi-colocated with a SS/PBCH block determined in an initial access process.

When a higher layer parameter (e.g., tci-PresentInDCI) indicating whether there is a TCI field in DCI configured for UE is set to be enabled for a CORESET scheduling a PDSCH, UE may assume that there is a TCI field in DCI format 1_1 of a PDCCH transmitted in a corresponding CORESET. When tci-PresentInDCI is not configured for a CORESET scheduling a PDSCH or when a PDSCH is scheduled by DCI format 1_0 and a time offset between reception of DL DCI and a corresponding PDSCH is equal to or greater than a predetermined threshold (e.g., timeDurationForQCL), in order to determine a PDSCH antenna port QCL, UE may assume that a TCI state or a QCL assumption for a PDSCH is the same as a TCI state or a QCL assumption applied to a CORESET used for PDCCH transmission. Here, the predetermined threshold may be based on reported UE capability.

When a parameter tci-PresentInDCI is set to be enabled, a TCI field in DCI in a scheduling CC (component carrier) may indicate an activated TCI state of a scheduled CC or a DL BWP. When a PDSCH is scheduled by DCI format 1_1, UE may use a TCI-state according to a value of a 'Transmission Configuration Indication' field of a detected PDCCH having DCI to determine a PDSCH antenna port QCL.

When a time offset between reception of DL DCI and a corresponding PDSCH is equal to or greater than a predetermined threshold (e.g., timeDurationForQCL), UE may assume that a DMRS port of a PDSCH of a serving cell is quasi-colocated with RS(s) in a TCI state for QCL type parameter(s) given by an indicated TCI state.

When a single slot PDSCH is configured for UE, an indicated TCI state may be based on an activated TCI state of a slot having a scheduled PDSCH.

When multiple-slot PDSCHs are configured for UE, an indicated TCI state may be based on an activated TCI state of a first slot having a scheduled PDSCH and UE may expect that activated TCI states across slots having a scheduled PDSCH are the same.

When a CORESET associated with a search space set for cross-carrier scheduling is configured for UE, UE may expect that a tci-PresentInDCI parameter is set to be enabled for a corresponding CORESET. When one or more TCI states are configured for a serving cell scheduled by a search space set including QCL-TypeD, UE may expect that a time offset between reception of a PDCCH detected in the search space set and a corresponding PDSCH is equal to or greater than a predetermined threshold (e.g., timeDurationForQCL).

For both of a case in which a parameter tci-PresentInDCI is set to be enabled and a case in which tci-PresentInDCI is not configured in a RRC connected mode, when a time offset between reception of DL DCI and a corresponding PDSCH is less than a predetermined threshold (e.g., timeDurationForQCL), UE may assume that a DMRS port of a PDSCH of a serving cell is quasi-colocated with RS(s) for QCL parameter(s) used for PDCCH QCL indication of a CORESET associated with a monitored search space having the lowest CORESET-ID in the latest slot where one or more CORESETs in an activated BWP of a serving cell is monitored by UE.

In this case, when QCL-TypeD of a PDSCH DMRS is different from QCL-TypeD of a PDCCH DMRS and they are overlapped in at least one symbol, UE may expect that reception of a PDCCH associated with a corresponding CORESET will be prioritized. It may be also applied to intra-band CA (carrier aggregation) (when a PDSCH and a CORESET exist in a different CC). When any of configured TCI states does not include QCL-TypeD, a different QCL assumption may be obtained from TCI states indicated for a scheduled PDSCH, regardless of a time offset between reception of DL DCI and a corresponding PDSCH.

For a periodic CSI-RS resource of configured NZP-CSI-RS-ResourceSet including a higher layer parameter trs-Info, UE may expect a TCI state to indicate one of the following QCL type(s).
 QCL-TypeC with a SS/PBCH block, and if applicable, QCL-TypeD with the same SS/PBCH block, or
 QCL-TypeC with a SS/PBCH block, and if applicable, QCL-TypeD with a CSI-RS resource in configured NZP-CSI-RS-ResourceSet including a higher layer parameter repetition For an aperiodic CSI-RS resource of configured NZP-CSI-RS-ResourceSet including a higher layer parameter trs-Info, UE may expect a TCI state to indicate QCL-TypeA with a periodic CSI-RS resource of NZP-CSI-RS-Resource- Set including a higher layer parameter trs-Info, and if applicable, QCL-TypeD with the same periodic CSI-RS resource.

For a CSI-RS resource of NZP-CSI-RS-ResourceSet configured without a higher layer parameter trs-Info and without a higher layer parameter repetition, UE may expect a TCI state to indicate one of the following QCL type(s).
- QCL-TypeA with a CSI-RS resource of configured NZP-CSI-RS-ResourceSet including a higher layer parameter trs-Info, and if applicable, QCL-TypeD with the same CSI-RS resource, or
- QCL-TypeA with a CSI-RS resource of configured NZP-CSI-RS-ResourceSet including a higher layer parameter trs-Info, and if applicable, QCL-TypeD with a SS/PBCH block, or
- QCL-TypeA with a CSI-RS resource of configured NZP-CSI-RS-ResourceSet including a higher layer parameter trs-Info, and if applicable, QCL-TypeD with a CSI-RS resource in configured NZP-CSI-RS-ResourceSet including a higher layer parameter repetition, or
- when QCL-TypeD is not applicable, QCL-TypeB with a CSI-RS resource in configured NZP-CSI-RS-ResourceSet including a higher layer parameter trs-Info.

For a CSI-RS resource of configured NZP-CSI-RS-ResourceSet including a higher layer parameter repetition, UE may expect a TCI state to indicate one of the following QCL type(s).
- QCL-TypeA with a CSI-RS resource of configured NZP-CSI-RS-ResourceSet including a higher layer parameter trs-Info, and if applicable, QCL-TypeD with the same CSI-RS resource, or
- QCL-TypeA with a CSI-RS resource of configured NZP-CSI-RS-ResourceSet including a higher layer parameter trs-Info, and if applicable, QCL-TypeD with a CSI-RS resource in configured NZP-CSI-RS-ResourceSet including a higher layer parameter repetition, or
- QCL-TypeC with a SS/PBCH block, and if applicable, QCL-TypeD with the same SS/PBCH block.

For a DMRS of a PDCCH, UE may expect a TCI state to indicate one of the following QCL type(s).
- QCL-TypeA with a CSI-RS resource of configured NZP-CSI-RS-ResourceSet including a higher layer parameter trs-Info, and if applicable, QCL-TypeD with the same CSI-RS resource, or
- QCL-TypeA with a CSI-RS resource of configured NZP-CSI-RS-ResourceSet including a higher layer parameter trs-Info, and if applicable, QCL-TypeD with a CSI-RS resource in configured NZP-CSI-RS-ResourceSet including a higher layer parameter repetition, or
- QCL-TypeA with a CSI-RS resource of NZP-CSI-RS-ResourceSet configured without a higher layer parameter trs-Info and without a higher layer parameter repetition, and if applicable, QCL-TypeD with the same CSI-RS resource.

For a DMRS of a PDSCH, UE may expect a TCI state to indicate one of the following QCL type(s).
- QCL-TypeA with a CSI-RS resource of configured NZP-CSI-RS-ResourceSet including a higher layer parameter trs-Info, and if applicable, QCL-TypeD with the same CSI-RS resource, or
- QCL-TypeA with a CSI-RS resource of configured NZP-CSI-RS-ResourceSet including a higher layer parameter trs-Info, and if applicable, QCL-TypeD with a CSI-RS resource in configured NZP-CSI-RS-ResourceSet including a higher layer parameter repetition, or
- QCL-TypeA with a CSI-RS resource of NZP-CSI-RS-ResourceSet configured without a higher layer parameter trs-Info and without a higher layer parameter repetition, and if applicable, QCL-TypeD with the same CSI-RS resource.

Multiple TRP (M-TRP) Related Operation

Figure 7:
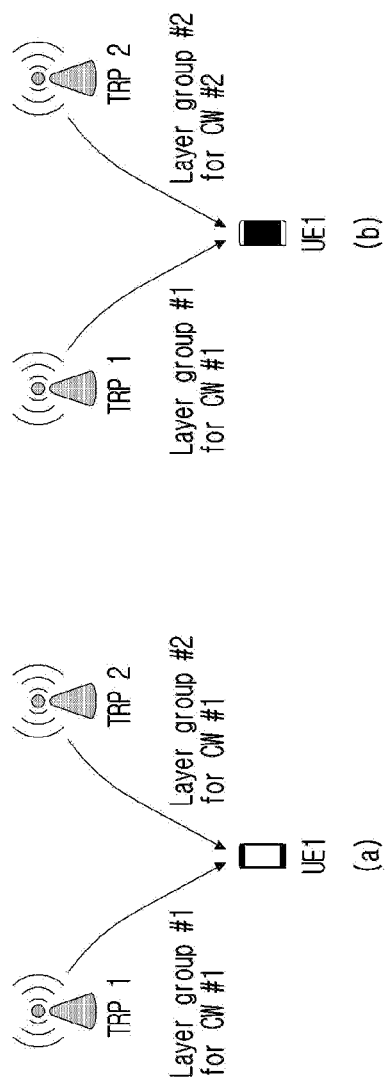
FIG. 7 illustrates a multiple Transmission and Reception Point (TRP) transmission scheme in a wireless communication system to which the present disclosure may be applied.

FIG. 7 illustrates a method of multiple TRPs transmission in a wireless communication system to which the present disclosure may be applied.

In reference to FIG. 7(a), it is shown a case in which layer groups transmitting the same codeword(CW)/transport block(TB) correspond to different TRPs. Here, a layer group may mean a predetermined layer set including one or more layers. In this case, there is an advantage that the amount of transmitted resources increases due to the number of a plurality of layers and thereby a robust channel coding with a low coding rate may be used for a TB, and additionally, because a plurality of TRPs have different channels, it may be expected to improve reliability of a received signal based on a diversity gain.

In reference to FIG. 7(b), an example that different CWs are transmitted through layer groups corresponding to different TRPs is shown. Here, it may be assumed that a TB corresponding to CW #1 and CW #2 in the drawing is identical to each other. In other words, CW #1 and CW #2 mean that the same TB is respectively transformed through channel coding, etc. into different CWs by different TRPs. Accordingly, it may be considered as an example that the same TB is repetitively transmitted. In case of FIG. 7(b), it may have a disadvantage that a code rate corresponding to a TB is higher compared to FIG. 7(a). However, it has an advantage that it may adjust a code rate by indicating a different RV (redundancy version) value or may adjust a modulation order of each CW for encoded bits generated from the same TB according to a channel environment.

According to methods illustrated in FIG. 7(a) and FIG. 7(b) above, probability of data reception of a terminal may be improved as the same TB is repetitively transmitted through a different layer group and each layer group is transmitted by a different TRP/panel. It is referred to as a SDM (Spatial Division Multiplexing) based M-TRP URLLC transmission method. Layers belonging to different layer groups are respectively transmitted through DMRS ports belonging to different DMRS CDM groups.

In addition, the above-described contents related to multiple TRPs are described based on an SDM (spatial division multiplexing) method using different layers, but it may be extended and applied to a frequency division multiplexing (FDM) method based on different frequency domain resources (e.g., RB/PRB (set), etc.) and/or a time division multiplexing (TDM) method based on different time domain resources (e.g., slots, symbols, sub-symbols, etc.).

Regarding a method for multiple TRPs based URLLC scheduled by single DCI, the following methods are discussed.

1) Method 1 (SDM): Time and frequency resource allocation is overlapped and n (n<=Ns) TCI states in a single slot 1-a) Method 1a.

The same TB is transmitted in one layer or layer set at each transmission time (occasion) and each layer or each layer set is associated with one TCI and one set of DMRS port(s).

A single codeword having one RV is used in all spatial layers or all layer sets. With regard to UE, different coded bits are mapped to a different layer or layer set by using the same mapping rule 1-b) Method 1b The same TB is transmitted in one layer or layer set at each transmission time (occasion) and each layer or each layer set is associated with one TCI and one set of DMRS port(s).

A single codeword having one RV is used in each spatial layer or each layer set. RV(s) corresponding to each spatial layer or each layer set may be the same or different.

1-c) Method 1c

The same TB having one DMRS port associated with multiple TCI state indexes is transmitted in one layer at one transmission time (occasion) or the same TB having multiple DMRS ports one-to-one associated with multiple TCI state indexes is transmitted in one layer.

In case of the above-described method 1a and 1c, the same MCS is applied to all layers or all layer sets.

2) Method 2 (FDM): Frequency resource allocation is not overlapped and n (n<=Nf) TCI states in a single slot Each non-overlapping frequency resource allocation is associated with one TCI state.

The same single/multiple DMRS port(s) are associated with all non-overlapping frequency resource allocation.

2-a) Method 2a

A single codeword having one RV is used for all resource allocation. With regard to UE, common RB matching (mapping of a codeword to a layer) is applied to all resource allocation.

2-b) Method 2b

A single codeword having one RV is used for each non-overlapping frequency resource allocation. A RV corresponding to each non-overlapping frequency resource allocation may be the same or different.

For the above-described method 2a, the same MCS is applied to all non-overlapping frequency resource allocation.

3) Method 3 (TDM): Time resource allocation is not overlapped and n (n<=Nt1) TCI states in a single slot Each transmission time (occasion) of a TB has time granularity of a mini-slot and has one TCI and one RV.

A common MCS is used with a single or multiple DMRS port(s) at all transmission time (occasion) in a slot.

A RV/TCI may be the same or different at a different transmission time (occasion).

4) Method 4 (TDM): n (n<=Nt2) TCI states in K (n<=K) different slots

Each transmission time (occasion) of a TB has one TCI and one RV.

All transmission time (occasion) across K slots uses a common MCS with a single or multiple DMRS port(s).

A RV/TCI may be the same or different at a different transmission time (occasion).

Downlink Multiple TRP (M-TRP) URLLC Transmission Operation

DL MTRP URLLC transmission method means that multiple TRPs transmit the same data/DCI by using a different space(e.g., layer, port)/time/frequency resource. For example, TRP 1 transmits the specific data/DCI in resource 1 and TRP 2 transmits the specific data/DCI(i.e., same data/DCI) in resource 2

UE configured with a DL MTRP-URLLC transmission method receives the same data/DCI by using a different layer/time/frequency resource. Here, UE may receive an indication of the QCL RS/type (i.e., DL TCI state) used in the space/time/frequency resource for receiving the corresponding data/DCI from the base station.

For example, when the data/DCI is received in resource 1 and resource 2, a DL TCI state used in resource 1 and a DL TCI state used in resource 2 may be indicated. UE may achieve high reliability because it receives the data/DCI through resource 1 and resource 2. Such DL MTRP URLLC may be applied to a PDSCH/a PDCCH.

UL MTRP-URLLC transmission method means that multiple TRPs receive the same data/UCI from any UE by using a different space/time/frequency resource. For example, TRP 1 may receive the same data/DCI from UE in resource 1 and TRP 2 may receive the same data/DCI from UE in resource 2. And, TRP 1 and TRP 2 may share data/UCI received from the UE through a backhaul link (connected between TRPs).

That is, UE configured with a UL MTRP-URLLC transmission method may transmit the same data/UCI by using a different space/time/frequency resource. Here, the UE may be indicated by the base station for a Tx beam and Tx power (i.e., UL TCI state) to be used in space/time/frequency resources for transmitting the same data/UCI. For example, when the same data/UCI is transmitted in resource 1 and resource 2, the UE may be indicated by the base station to indicate the UL TCI state used in resource 1 and the UL TCI state used in resource 2 from the base station. This UL M-TRP URLLC may be applied to PUSCH/PUCCH.

In addition, in describing the present disclosure, when receiving/transmitting data/DCI/UCI through a specific space/time/frequency resource, using (or mapping) a specific TCI state(or TCI) may mean that, for DL, estimating a channel from the DMRS using the QCL type and QCL RS indicated by a specific TCI state in a specific space/time/frequency resource, and receiving/demodulating data/DCI/UCI with the estimated channel.

In addition, when receiving/transmitting data/DCI/UCI through a specific space/time/frequency resource, using (or mapping) a specific TCI state (or, TCI) may mean that, for UL, DMRS and data/UCI are transmitted/modulated using a Tx beam and/or Tx power indicated by a specific TCI state in a specific space/time/frequency resource.

And, the UL TCI state may include Tx beam or Tx power information of the UE. In addition, the base station may configure spatial relation information or the like for the UE through other parameters instead of the TCI state.

For example, the UL TCI state may be directly indicated to the UE through a UL grant DCI. Alternatively, the UL TCI state may mean spatial relationship information of an SRS resource indicated through an SRS resource indicator (SRI) field of a UL grant DCI. Alternatively, the UL TCI state may mean an open loop (OP) Tx power control parameter connected to a value indicated through the SRI field of the UL grant DCI.

Here, the OL Tx power control parameter may include, for example, j (index and alpha for OP parameter(s) Po (maximum 32 parameter values set per cell), q_d (index of DL RS resources for PL (path loss) measurement (up to 4 measurements per cell), or/and I(closed loop power control process index (up to 2 processes per cell)).

As another embodiment of the present disclosure, the M-TRP eMBB transmission method refers to a method in which M-TRP transmits different data/DCI using different space/time/frequency resources. If the M-TRP eMBB transmission method is configured, it may be assumed that the UE receives a plurality of TCI states from the base station through DCI, and that data received using QCL RSs indicated by each of the plurality of TCI states are different from each other.

In addition, since the RNTI for M-TRP URLLC and the M-TRP eMBB RNTI are separately used, the UE may determine whether a specific transmission/reception is M-TRP URLLC transmission/reception or M-TRP eMBB transmission/reception. For example, when RNTI for URLLC is used and CRC masking is performed for DCI, the UE may determine the corresponding transmission as URLLC transmission. In addition, when the RNTI for eMBB is used and CRC masking is performed for DCI, the UE may determine the corresponding transmission as eMBB transmission. As another example, the base station may configure the M-TRP URLLC transmission/reception method or the M-TRP eMBB transmission/reception method to the UE through new signaling.

For convenience of description of the present disclosure, it has been assumed that 2 TRPs cooperate with each other to perform a transmission/reception operation, but the present disclosure is not limited thereto. That is, the present disclosure may be extended and applied even in a multi-TRP environment of 3 or more, and may be extended and applied even in an environment in which transmission/reception is performed in different panels or beams in the same TRP. The UE may recognize different TRPs as different TCI states. That the UE transmits/receives data/DCI/UCI using TCI state 1 means that it transmits/receives data/DCI/UCI/from TRP 1 (or to TRP 1).

The present disclosure may be utilized in a situation in which the M-TRP cooperatively transmits the PDCCH (repetitively transmits or divides the same PDCCH). In addition, the present disclosure may be utilized in a situation in which M-TRP cooperatively transmits PDSCH or cooperatively receives PUSCH/PUCCH.

In addition, in describing the present disclosure, repeatedly transmitting the same PDCCH by a plurality of base stations (M-TRP) may mean transmitting the same DCI through a plurality of PDCCH candidates and has the same meaning that multiple base stations repeatedly transmit the same DCI. Here, two DCIs having the same DCI format/size/payload may be viewed as the same DCI.

Alternatively, if the scheduling results are the same even if the payloads of the two DCIs are different, the two DCIs may be regarded as the same DCI. For example, the time domain resource allocation (TDRA) field of DCI may relatively determine the slot/symbol position of data and the slot/symbol position of A(ACK)/N(NACK) based on the reception time of the DCI.

In this case, when the DCI received at time n and the DCI received at time n+1 indicate the same scheduling result to the UE, the TDRA fields of the two DCIs are different, and as a result, the DCI payload is different from each other. Accordingly, even if the payloads of the two DCIs are different, if the scheduling results are the same, the two DCIs may be regarded as the same DCI. Here, the number of repetitions R may be directly indicated by the base station to the UE or mutually promised.

Alternatively, even if the payloads of the two DCIs are different and the scheduling results are not the same, when the scheduling result of one DCI is a subset of the scheduling result of the other DCI, the two DCIs may be regarded as the same DCI.

For example, if the same data is TDM and repeatedly transmitted N times, DCI 1 received before the first data indicates (or schedules) repetition of data N times, and DCI 2 received before the second data indicates repetition (scheduling) of data N−1. In this case, the scheduling result (or data) of DCI 2 becomes a subset of the scheduling result (or data) of DCI 1, and both DCIs have scheduling results for the same data. Accordingly, even in this case, the two DCIs may be regarded as the same DCI.

And, in describing the present disclosure, dividing and transmitting the same PDCCH by a plurality of base stations may mean that one DCI is transmitted through one PDCCH candidate, but TRP 1 transmits some resources defined for the corresponding PDCCH candidate and TRP 2 transmits the remaining resources.

For example, when TRP 1 and TRP 2 divide and transmit PDCCH candidates corresponding to aggregation level m1+m2, a PDCCH candidate may be divided into PDCCH candidate 1 corresponding to aggregation level m1 and PDCCH candidate 2 corresponding to aggregation level m2, TRP 1 may transmit PDCCH candidate 1, and TPR 2 may transmit PDCCH candidate 2. In this case, TRP 1 and TRP 2 may transmit PDCCH candidate 1 and PDCCH candidate 2 using different time/frequency resources. After receiving the PDCCH candidate 1 and the PDCCH candidate 2, the UE may generate a PDCCH candidate corresponding to the aggregation level m1+m2 and attempt DCI decoding.

In this case, the method in which the same DCI is divided and transmitted to several PDCCH candidates may be implemented in the following two methods.

The first method is a method in which DCI payload (e.g., control information+CRC) is encoded through one channel encoder (e.g., polar encoder) and divided into two TRPs and transmitted. That is, the first method means a method of dividing and transmitting the coded bits obtained according to the encoding result in two TRPs. Here, the entire DCI payload may be encoded in the coded bit transmitted by each TRP, but is not limited thereto, and only some DCI payloads may be encoded.

The second method divides the DCI payload (e.g., control information+CRC) into two DCIs (DCI 1 and DCI 2) and encodes each of them through a channel encoder (e.g., a polar encoder). Thereafter, each of the two TRPs may transmit a coded bit corresponding to DCI 1 and a coded bit corresponding to DCI 2 to the terminal.

That is, dividing/repeating the same PDCCH by a plurality of base stations (M-TRP) and transmitting over a plurality of monitoring occasions (MOs) may mean that 1) the coded bit encoding the entire DCI content of the corresponding PDCCH is repeatedly transmitted through each MO for each base station (S-TRP), 2) the coded bit encoding the entire DCI content of the corresponding PDCCH is divided into a plurality of parts, and each base station (S-TRP) transmits different parts through each MO, or 3) the DCI content of the corresponding PDCCH is divided into a plurality of parts, and different parts are encoded for each base station (S-TRP) (that is, separately encoded) and transmitted through each MO.

Repeatedly/split transmission of the PDCCH may be understood as transmitting the PDCCH multiple times over several transmission occasions (TO).

Here, TO may mean a specific time and/or frequency resource unit in which the PDCCH is transmitted. For example, when the PDCCH is transmitted multiple times (to a specific RB) over slots 1, 2, 3, and 4, TO may mean each slot. As another example, if the PDCCH is transmitted multiple times (in a specific slot) over RB sets 1, 2, 3, and 4, TO may mean each RB set. As another example, if the PDCCH is transmitted multiple times over different times and frequencies, TO may mean each time/frequency resource. In addition, the TCI state used for DMRS channel estimation may be set differently for each TO, and it may be assumed that the TOs in which the TCI state is set differently are transmitted by different TRPs/panels.

Repeatedly transmitting or dividing the PDCCH by a plurality of base stations may mean that the PDCCH is transmitted over multiple TOs, and the union of the TCI states configured in the corresponding TOs consists of two or more TCI states. For example, PDCCH transmitting over TO 1,2,3,4 may mean that TCI states 1,2,3,4 are configured in each of TO 1,2,3,4 and TRP i cooperatively transmits the PDCCH in TO i.

In describing the present disclosure, repeatedly transmitting the same PUSCH to a plurality of base stations (i.e., M-TRP) by the UE may mean that the UE transmits the same data through a plurality of PUSCHs, and each PUSCH may be transmitted by being optimized for UL channels of different TRPs.

For example, the UE may repeatedly transmit the same data through PUSCH 1 and PUSCH 2. In this case, PUSCH 1 may be transmitted using UL TCI state 1 for TRP 1, and link adaptation such as precoder/MCS may also be scheduled to receive a value optimized for the channel of TRP 1 to transmit the PUSCH. PUSCH 2 is transmitted using UL TCI state 2 for TRP 2, and link adaptation such as a precoder/MCS may also be scheduled for a value optimized for the channel of TRP 2 to transmit the PUSCH. In this case, the repeatedly transmitted PUSCH 1 and PUSCH 2 may be transmitted at different times to be TDM, FDM, or SDM.

In addition, in describing the present disclosure, transmitting, by UE to a plurality of base stations (i.e., M-TRP), the same PUSCH by dividing it may mean that one data is transmitted through one PUSCH, but the resources allocated to the PUSCH are divided and optimized for UL channels of different TRPs for transmission.

For example, the UE may transmit the same data through a 10-symbol PUSCH. At this time, the first 5 symbols among 10 symbols may be transmitted using UL TCI state 1 for TRP 1, and the UE may transmit a 5-symbol PUSCH (to TRP 1) by receiving a link adaptation such as precoder/MCS and scheduling a value optimized for a channel of TRP 1. The remaining 5 symbols may be transmitted using UL TCI state 2 for TRP 2, and the UE may transmit the remaining 5-symbol PUSCH (with TRP 2) by receiving a link adaptation such as precoder/MCS and scheduling a value optimized for the channel of TRP 2.

In the above example, a method of dividing one PUSCH into time resources and performing TDM transmission for TRP 1 and TRP 2 has been described. However, the present disclosure is not limited thereto, and the UE may divide and transmit the same PUSCH to a plurality of base stations by using the FDM/SDM method.

The UE may repeatedly transmit the PUCCH to a plurality of base stations (similar to PUSCH transmission) or divide and transmit the same PUCCH.

And, when a plurality of TOs are indicated for the terminal in order to repeatedly transmit PDCCH/PDSCH/PUSCH/PUCCH or divide and transmit PDCCH/PDSCH/PUSCH/PUCCH, for each TO, UL may be transmitted toward a specific TRP, or DL may be received from a specific TRP. At this time, the UL TO (or the TO of TRP 1) transmitted toward TRP 1 may mean a TO using a first value of two spatial relations, two UL TCIs, two UL power control parameters or two pathloss (PL)-RS indicated to the terminal. And, UL TO (or TO of TRP 2) transmitted toward TRP 2 may mean a TO using a second value of two spatial relations, two UL TCIs, two UL power control parameters, or two PL-RSs indicated to the UE.

Similarly, in the case of DL transmission, the DL TO transmitted by TRP 1 (or TO of TRP 1) may mean a TO using a first value of two DL TCI states indicated to the terminal (e.g., when two TCI states are set in CORESET), and the DL TO transmitted by TRP 2 (or TO of TRP 2) may mean a TO using a second value of two DL TCI states indicated to the terminal (e.g., two TCI states are set in CORESET).

The present disclosure may be extended and applied to various channels such as PUSCH/PUCCH/PDSCH/PDCCH. In addition, the present disclosure may be extended and applied to both the case of repeatedly transmitting the channel and the case of dividing and transmitting the channel in different space/time/frequency resources.

In addition, in terms of the DCI transmission, the M-TRP transmission scheme may be divided into i) a multiple DCI (M-DCI)-based M-TRP transmission scheme in which each TRP transmits a different DCI, and ii) a single DCI (S-DCI)-based M-TRP transmission scheme in which one TRP transmits a DCI. For example, in the case of S-DCI, since all scheduling information for data transmitted by the M-TRP need to be transferred through one DCI, it may be used in an ideal BackHaul (ideal BH) environment where dynamic cooperation between two TRPs is possible.

Related to Enhanced M-TRP Transmission and Reception

With respect to M-TRP transmission/reception in Rel-16 NR standardization, PDSCH transmission/reception according to the S-DCI based M-TRP transmission scheme and the M-DCI based M-TRP transmission scheme is supported.

First, an S-DCI based M-TRP PDSCH transmission scheme will be described.

One of SDM/FDM/TDM schemes may be used for S-DCI based M-TRP PDSCH transmission. In the case of SDM, the base station transmits one TB using a multi-layer, but transmits layers belonging to different DMRS CDM groups with different Tx beams (i.e., QCL RS or TCI state). Through this, the transmission capacity may be improved by increasing the number of layers compared to the existing S-TRP transmission scheme. In addition, when one TB is transmitted using multiple layers, some layers are transmitted to TRP 1 and the other layers are transmitted to TRP 2, whereby channel reliability due to diversity gain may be improved.

In the case of FDM, scheme 2a and 2b are supported. Here, scheme 2a is a scheme in which one TB is transmitted using a multi-RB, but RBs belonging to different RB groups are transmitted using different Tx beams (i.e., QCL RS or TCI state). Scheme 2b is a scheme for transmitting the same TB using different RB groups, but transmitting RBs belonging to different RB groups using different Tx beams (i.e., QCL RS or TCI state). In the case of TDM, schemes 3 and 4, are supported. Here, scheme 4 (i.e., inter-slot TDM) is a scheme for repeatedly transmitting the same TB in several slots, but transmitting slots belonging to different slot groups using different Tx beams (i.e., QCL RS or TCI state). On the other hand, Scheme 3 (i.e., intra-slot TDM) is a scheme for repeatedly transmitting the same TB in several OFDM symbol groups, but transmitting some OFDM symbol groups and the remaining OFDM symbol groups using different Tx beams (i.e., QCL RS or TCI state).

Next, an M-DCI based M-TRP PDSCH transmission scheme will be described.

M-DCI based MTRP PDSCH transmission is a scheme in which each TRP schedules and transmits a PDSCH through DCI. That is, TRP 1 transmits PDSCH 1 through DCI 1, and TRP 2 transmits PDSCH 2 through DCI 2. When PDSCH 1 and PDSCH 2 overlap on the same frequency and time resource, since two PDSCHs are received for the same RE, resource efficiency is increased and transmission capacity is increased. For this, the concept of a CORESET pool, which means a group of several CORESETs, has been introduced. For example, TRP 1 transmits a PDCCH through CORESET belonging to CORESET pool 0, and also transmits a PDSCH scheduled by the corresponding PDCCH. TRP 2 transmits a PDCCH through CORESET belonging to CORESET pool 1, and also transmits a PDSCH scheduled by the corresponding PDCCH.

Even in the case of PUSCH, a specific TRP may schedule PUSCH transmission to the UE through CORESET belonging to each COERSET pool. For example, some PUCCH resources may be scheduled by TRP 1, and the remaining PUCCH resources may be scheduled by TRP 2. The UE may transmit an independent PUSCH/PUCCH for each of TRPs 1 and 2.

In addition, the UE may recognize a PUSCH (or PUCCH) scheduled by DCI received based on different CORESETs (or CORESETs belonging to different CORESET groups) as a PUSCH (or PUCCH) transmitted to different TRPs or as a PUSCH (or PUCCH) of a different TRP. In addition, the scheme for UL transmission (e.g., PUSCH/PUCCH) transmitted to different TRPs may be equally applied to UL transmission transmitted to different panels belonging to the same TRP.

In addition, the CORESET group ID (or COERSET pool index with the same meaning) described/mentioned in the present disclosure may mean index/identification information (e.g., ID) for distinguishing CORESET for each TRP/panel. In addition, the CORESET group may mean a group/union of CORESETs distinguished by index/identification information (e.g., ID)/CORESET group ID for distinguishing CORESETs for each TRP/panel. As an example, the CORESET group ID may be specific index information defined in CORESET configuration. That is, the CORESET group may be configured/indicated/defined by the index defined in the CORESET configuring for each CORESET. And/or, the CORESET group ID may mean an index/identification information/indicator for classification/identification between CORESETs configured/related to each TRP/panel.

CORESET group ID described/mentioned in this disclosure may be expressed by being replaced with a specific index/specific identification information/specific indicator for classification/identification between CORESETs set/associated with each TRP/panel. Corresponding information may be configured/indicated through higher layer signaling (e.g., RRC signaling, MAC-CE, etc.) and/or physical layer signaling (e.g., DCI). As an example, it may be configured/indicated to perform PDCCH detection for each TRP/panel in a corresponding CORESET group unit, and UCI (e.g., CSI, HARQ-ACK/NACK, SR, etc.) for each TRP/panel in a corresponding CORESET group unit. And/or uplink physical channel resources (e.g., PUCCH/PRACH/SRS resources) may be configured/indicated to be managed/controlled separately. And/or, HARQ ACK/NACK (process/retransmission) for PDSCH/PUSCH, etc. scheduled for each TRP/panel in units of the corresponding CORESET group may be managed.

For example, the higher layer parameter ControlResourceSet IE (information element) is used to configured a time/frequency control resource set (control resource set, CORESET). The corresponding CORESET may be related to detection/reception of downlink control information. The ControlResourceSet IE may include a CORESET-related ID (e.g., controlResourceSetID)/CORESET pool index for CORESET (e.g., CORESETPoolIndex)/time/frequency resource setting of CORESET/TCI information related to CORESET. As an example, the index of the CORESET pool (e.g., CORESETPoolIndex) may be configured to 0 or 1. In the above description in the present disclosure, a CORESET group may correspond to a CORESET pool, and a CORESET group ID may correspond to a CORESET pool index (e.g., CORESETPoolIndex). The aforementioned ControlResourceSet (ie, CORESET) may be configured through higher layer signaling (e.g., RRC signaling).

Additionally, in relation to M-TRP transmission and reception in Rel-17 NR standardization, M-TRP PDCCH/PDSCH SFN transmission, S-DCI based M-TRP PUSCH repetition transmission, and single PUCCH resource based M-TRP PUCCH repetition transmission are supported. In the transmission schemes, the same contents (i.e., DCI/UL TB/UCI, etc.) are repeatedly transmitted by improving the URLLC target for increasing reliability. Here, M-TRP PDCCH repetition transmission is performed based on TDM or FDM, M-TRP PDCCH/PDSCH SFN transmission is performed in the same time/frequency/layer, and S-DCI based M-TRP PUSCH repetition transmission is performed based on TDM, and a single PUCCH resource based M-TRP PUCCH repetition transmission is performed based on TDM.

First, the S-DCI based M-TRP PDCCH repetition transmission scheme will be described.

In NR Rel-17 standardization, a plurality of CORESETs in which different TCI states (i.e., different QCL RSs) are configured for M-TRP PDCCH repetition transmission are configured to the terminal, and a plurality of SS sets respectively connected to the corresponding CORESETs are configured. The base station may indicate/configured that the SS set connected to one CORESET and the SS set connected to another CORESET are linked for repetition transmission to the terminal. Through this, the terminal may recognize that PDCCH candidates of the corresponding SS set are repeatedly transmitted.

For example, two CORESETs, CORESET 0 and CORESET 1, may be configured to the terminal, CORESET 0 and CORESET 1 may be connected to SS set 0 and SS set 1, respectively, and SS set 0 and SS set 1 may be linked. The terminal may recognize that the same DCI is repeatedly transmitted in the PDCCH candidate of SS set 0 and the PDCCH candidate of SS set 1, and based on a specific rule, the terminal may recognize that the specific PDCCH candidate of SS set 0 and the specific PDCCH candidate of SS set 1 correspond to a pair configured for repeatedly transmitting the same DCI. The two PDCCH candidates may be referred to as linked PDCCH candidates, and when the terminal properly receives any one of the two PDCCH candidates, the corresponding DCI may be successfully decoded. However, when receiving the PDCCH candidate of SS set 0, the terminal may use the QCL RS (i.e., DL beam) of the TCI state of COERSET 0 connected to SS set 0, and when receiving the PDCCH candidate of SS set 1, the terminal may use the QCL RS (ie, DL beam) of the TCI state of COERSET 1 connected to SS set 1. Accordingly, the terminal receives the associated PDCCH candidates using different beams.

Next, the M-DCI based M-TRP PDCCH repetition transmission scheme will be described.

As one of the M-TRP PDCCH repetition transmission types, a plurality of TRPs may repeatedly transmit the same DCI through the same time/frequency/DMRS port, and such a transmission method may be referred to as SFN PDCCH transmission. However, for SFN PDCCH transmission, the base station configures a plurality of TCI states in one CORESET instead of configuring a plurality of CORESETs in which different TCI states are configured. When the terminal receives the PDCCH candidate through the SS set connected to the one CORESET, the terminal may perform channel estimation of the PDCCH DMRS and attempt decoding by using all of the plurality of TCI states.

In addition, during the above-described M-TRP PDSCH repetition transmission, the two TRPs repeatedly transmit the corresponding channel to different resources. However, when the resources used by the two TRPs are the same, that is, when the same channel is repeatedly transmitted through the same frequency/time/layer (i.e., DMRS port), the reliability of the corresponding channel may be improved. In this case, since the same channel repeatedly transmitted is received while being transmitted (i.e., air) because the resources are not distinguished, it may be recognized as one channel (e.g., a composite channel) from a reception side (e.g., terminal). For SFN PDSCH transmission, two DL TCI states for PDSCH DMRS reception may be configured in the terminal.

Next, the S-DCI based M-TRP PUSCH repetition transmission scheme will be described.

In NR Rel-17 standardization, the base station configured two SRS sets to the terminal for S-DCI based M-TRP PUSCH transmission, and each set is used for indicating UL beam/QCL information for a UL Tx port for TRP 1 and TRP 2. In addition, the base station may indicate the SRS resource for each SRS resource set through two SRI fields included in one DCI, and may indicate up to two PC parameter sets. For example, the first SRI field may indicate the SRS resource and PC parameter set defined in SRS resource set 0, and the second SRI field may indicate the SRS resource and PC parameter set defined in SRS resource set 1. The terminal may be indicated with UL Tx port, PC parameter set, and UL beam/QCL information for TRP 1 through the first SRI field, and through this, the terminal performs PUSCH transmission in the TO corresponding to SRS resource set 0. Similarly, the terminal may be indicated with UL Tx port, PC parameter set, and UL beam/QCL information for TRP 2 through the second SRI field, and through this, the terminal performs PUSCH transmission in the TO corresponding to SRS resource set 1.

Next, the Single PUCCH resource based M-TRP PUCCH repetition transmission scheme will be described.

In NR Rel-17 standardization, the base station may activate/configure two spatial relation info on a single PUCCH resource to the terminal for the Single PUCCH resource based M-TRP PUCCH transmission (if FR1, enable/configure two PC parameter sets). When UL UCI is transmitted through the corresponding PUCCH resource, each spatial relation info is used to indicate to the terminal the spatial relation info for TRP 1 and TRP 2, respectively. For example, through the value indicated in the first spatial relation info, the terminal is indicated with Tx beam/PC parameter(s) toward TRP 1, and the terminal perform PUCCH transmission in TO corresponding to TRP 1 using corresponding information. Similarly, through the value indicated in the second spatial relation info, the terminal is indicated with Tx beam/PC parameter(s) toward TRP 2, and the terminal performs PUCCH transmission in the TO corresponding to TRP 2 using the corresponding information.

In addition, for M-TRP PUCCH repetition transmission, the configuring scheme is improved so that two spatial relation info may be configured in the PUCCH resource. That is, when power control (PC) parameters such as PLRS, Alpha, P0, and Closed loop index are set in each spatial relation info, spatial relation RS may be configured. As a result, PC information and spatial relation RS information corresponding to two TRPs may be configured through two spatial relation info. Through this, the terminal transmits UCI (i.e., CSI, ACK/NACK, SR, etc.) PUCCH in the first TO using the first spatial relation info, and transmits the same UCI PUCCH in the second TO using the second spatial relation info. In the present disclosure, a PUCCH resource in which two spatial relation info is configured is referred to as an M-TRP PUCCH resource, and a PUCCH resource in which one spatial relation info is configured is referred to as an S-TRP PUCCH resource.

In the overall description and/or proposed method of the present disclosure, the meaning of using/mapping a specific TCI state (or TCI) when transmitting/receiving data/DCI/UCI for a certain frequency/time/spatial resource may mean, in the case of DL, estimating a channel from the DMRS using the QCL type and QCL RS indicated by the corresponding DL TCI state in the corresponding frequency/time/spatial resource and receiving/demodulating the estimated data/DCI. In addition, in the case of UL, the corresponding meaning may mean transmitting/modulating DMRS and data/UCI using the Tx beam and/or Tx power indicated by the UL TCI state in the corresponding frequency/time/spatial resource.

Here, the UL TCI state may include information for the Tx beam and/or Tx power of the terminal, and spatial relation info, etc. may be configured to the terminal through other parameters instead of the TCI state. The UL TCI state may be directly indicated by the UL grant DCI, and may mean spatial relation info of the SRS resource indicated through the SRI field of the UL grant DCI. Alternatively, the UL TCI state is an Open Loop (OL) Tx power control parameter (e.g., j: index for open loop parameters Po & alpha (maximum 32 parameter value sets per cell), q_d: index of DL RS resource for PL measurement (maximum 4 measurements per cell), l: may mean closed loop power control process index (maximum 2 processes per cell)) connected to a value indicated through the SRI field of the UL grant DCI. In addition, the UL TCI state may be indicated through DL grant DCI as well as UL grant DCI.

In the present disclosure, for convenience of explanation, the proposed method(s) was applied assuming cooperative transmission/reception between 2 TRPs, but the proposed method(s) may be extended and applied even in a multi-TRP environment of 3 or more, and multiple It may be extended and applied even in the panel environment. Here, different TRPs may be recognized by the terminal as different TCI states, and when the terminal transmits and receives data/DCI/UCI using the first TCI state (i.e., TCI state 1), it may mean transmitting and receiving data/DCI/UCI to/from first TRP (i.e., TRP 1).

In the present disclosure, TO (Transmission Occasion) may mean each channel transmitted at different times when multiple channels are TDMed, and when multiple channels are FDM, it may mean each channel transmitted at different frequencies/RBs, and when multiple channels are SDM, it may mean each channel transmitted to a different layer/beam/DMRS port. One TCI state may be mapped to each TO. When the same channel is repeatedly transmitted, intact data/DCI/UCI is transmitted to one TO, and the receiving side may receive multiple TOs and then the reception success rate may be increased.

Figure 8:
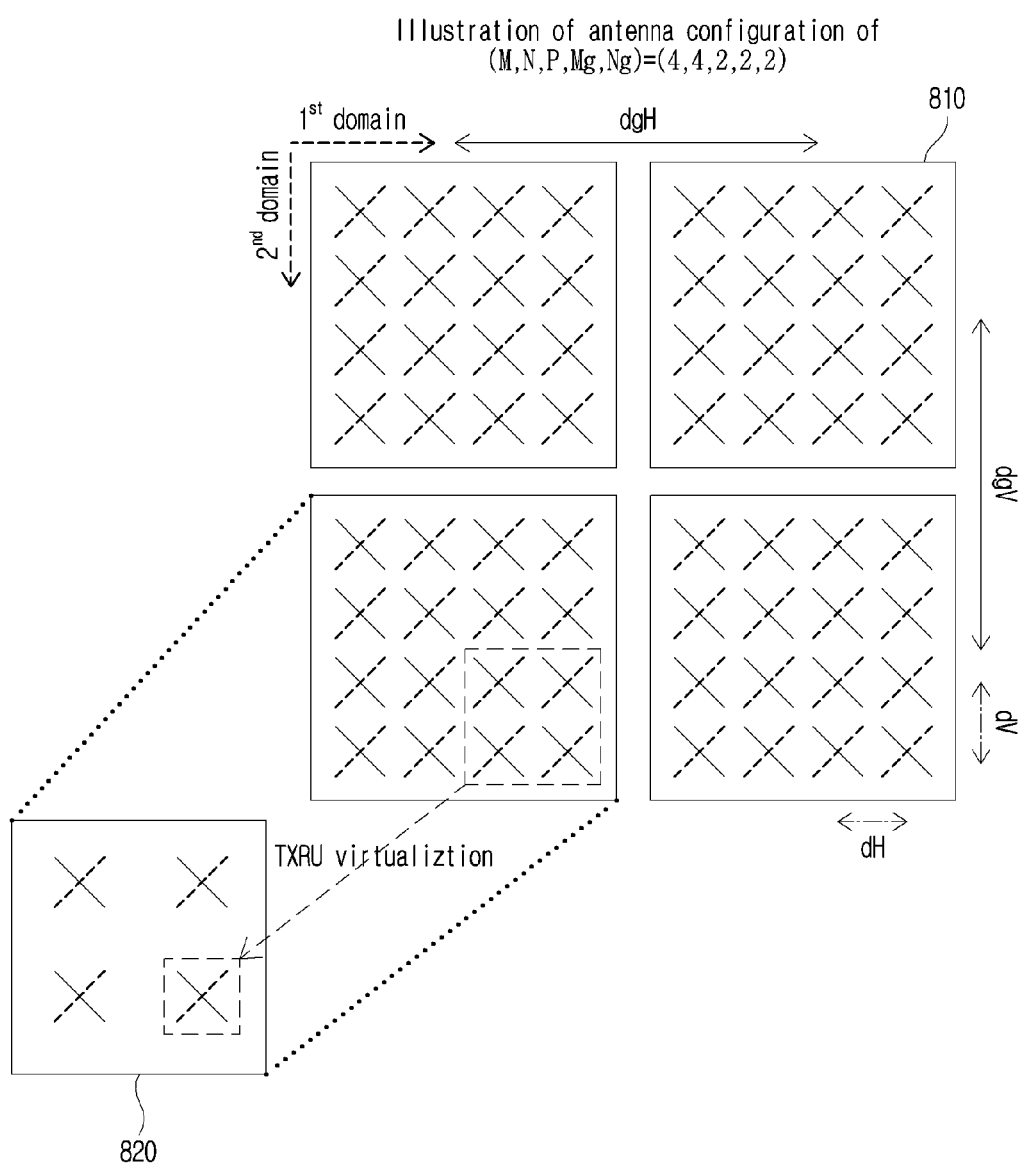
FIG. 8 illustrates an antenna configuration and a port configuration in a panel in a wireless communication system to which the present disclosure may be applied.

FIG. 8 illustrates an antenna configuration and a port configuration in a panel in a wireless communication system to which the present disclosure may be applied.

Referring to FIG. 8, an antenna configuration 810 may be configured for a first domain (1st domain) and a second domain (2nd domain), and TXRU virtualization may be applied in relation to an antenna configuration 810 and a port configuration 820.

With respect to the antenna configuration 810, M means the number of columns in the panel (i.e., the number of antenna ports in the first domain in the panel), and N is the number of rows in the panel (i.e., the number of antenna ports in the second domain within the panel), P means polarization (1: co-pol, 2:X-pol), Mg means the number of panels in the first domain, and Ng means the number of panels in the second domain. Accordingly, the total number of antenna elements may be expressed as P*M*N*Mg*Ng. For example, the antenna configuration 810 shown in FIG. 8 corresponds to [(M, N, P, Mg, Ng)=(4, 4, 2, 2, 2)]. In FIG. 8, dgH means panel spacing in the first domain, dgV means channel spacing in the second domain, dH means antenna spacing in the first domain, and, dV means an antenna spacing in the second domain.

With respect to the panel configuration 820, N1 means the number of columns in the first domain (i.e., the number of antenna ports in the first domain within the panel), and N2 means the number of rows in the second domain (i.e., the number of antenna ports in the second domain within the panel), and P means polarization (1: co-pol, 2: X-pol). Accordingly, the total number of CSI-RS ports in the panel may be expressed as P*N1*N2. For example, the panel configuration 820 illustrated in FIG. 8 corresponds to [(N1, N2, P)=(2, 2, 2)].

Antenna Port and/or CSI-RS Configuration Method Considering Codebook Design

The present disclosure is for an antenna port and/or a CSI-RS configuration method considering a sophisticated codebook design to improve performance, when a base station and/or a base station having a plurality a plurality of panels performs DL transmission to a terminal based on Coherent Joint Transmission (CJT). Here, in the case of CJT, it may be assumed that a plurality of base stations are connected through an ideal backhaul, and accordingly, it may be assumed that synchronization between the base stations is consistent.

For example, a codebook (CB) supported by the NR system may be largely divided into Type 1 CSI and Type 2 CSI. Here, in the case of Type 1 CSI, it may be divided into a single-panel codebook and a multi-panel codebook. Each codebook is configured by targeting mainly Single User (SU)-MIMO, and the corresponding codebook may be configured in terms of the selection of singular/multiple DFT vetcor(s) preferred in an oversampled DFT vector set that is a spatial doamin (SD) basis. Further, the corresponding codebook may be configured in terms of the indication of the co-phase for cross polarization of the base station antenna.

On the other hand, the Type 2 CSI may correspond to a codebook used for the purpose of improving MU-MIMO performance, by selecting a plurality of DFT vectors that are the SD basis and configuring a codebook having high resolution by linearly combining the selected DFT vectors. In this regard, enhanced Type 2 CSI (eType 2 CSI) has been introduced in a manner of reducing the payload of the codebook in consideration of correlation on the frequency axis.

In the present disclosure, methods for resource configuration for performing CJT using the above-described codebook or the like are proposed.

Embodiment 1

This embodiment relates to a method for configuring an antenna port and/or codebook parameter for supporting CJT performance based on a codebook or the like.

For DL data transmission through a plurality of TRPs/panels, the terminal calculates CSI by measuring RS (e.g., CSI-RS, DMRS, etc.) from a plurality of TRPs, and reports the CSI to the base station. In this case, for CSI measurement, the base station needs to indicate to the terminal along with information on various antenna shapes (e.g., antenna configuration, etc.)/TRPs of the plurality of TRPs. This is because the spatial domain basis (SD basis) of the codebook used for CSI reporting (e.g., dimension/length/type of DFT) is determined by the TRP/panel antenna shape.

As a method of indicating such an antenna shape, 1) a method that one representative TRP indicates information for the antenna shape, and 2) a method for indicating information for the antenna shape for each TRP, which is a more flexible method, may be considered.

Antenna configuration configurable when using the Type 1 multi-panel codebook in the NR system may be as shown in Table 6 below.

TABLE 6

| Number of CSI-RS ports | $(N_g, N_1, N_2)$ | $(O_1, O_2)$ |
| --- | --- | --- |
| 8 | (2, 2, 1) | (4, —) |
| 16 | (2, 2, 2) | (4, 4) |
|  | (2, 4, 1), (4, 2, 1) | (4, —) |
| 32 | (2, 4, 2), (4, 2, 2) | (4, 4) |
|  | (2, 8, 1), (4, 4, 1) | (4, —) |

In Table 6, $N_g$ represents the number of panels, and $N_1$ and $N_2$ represent the number of antenna ports in the first domain and the number of antenna ports in the second domain, respectively. In addition, $O_1$ and $O_2$ represent an oversampling factor in each domain. A higher layer standard (e.g., TS 38.331 RRC standard) for an example of the corresponding Type 1 multi-panel codebook may be as shown in Table 7 below.

TABLE 7

CodebookConfig
The IE CodebookConfig is used to configure codebooks of Type-I and Type-II (see TS 38.214 [19], clause 5.2.2.2)

CodebookConfig information element

```
CodebookConfig ::=           SEQUENCE {
    codebookType                 CHOICE {
        type1                        SEQUENCE {
            subType                      CHOICE {
                typeI-MultiPanel             SEQUENCE {
                    ng-n1-n2                     CHOICE {
                        two-two-one-TypeI-MultiPanel-Restriction    BIT STRING (SIZE (8)),
                        two-four-one-TypeI-MultiPanel-Restriction   BIT STRING (SIZE (16)),
```

TABLE 7-continued

```
        four-two-one-TypeI-MultiPanel-Restriction      BIT STRING (SIZE (8)),
        two-two-two-TypeI-MultiPanel-Restriction       BIT STRING (SIZE (64)),
        two-eight-one-TypeI-MultiPanel-Restriction     BIT STRING (SIZE (32)),
        four-four-one-TypeI-MultiPanel-Restriction     BIT STRING (SIZE (16)),
        two-four-two-TypeI-MultiPanel-Restriction      BIT STRING (SIZE (128)),
        four-two-two-TypeI-MultiPanel-Restriction      BIT STRING (SIZE (64))
      },
      ri-Restriction                                   BIT STRING (SIZE (4))
    }
  },
  codebookMode                                         INTEGER (1..2)
```

In the case of CJT transmission from a plurality of TRP, an antenna configuration and codebook subset restrictions (e.g., PMI and/or RI) for CJT (e.g., Type II M-TRP-r-18) considered in the present disclosure (e.g., PMI and/or RI) may be configured as TRP common by the representative TRP as follows, rather than independent configuration for each TRP.

An example to be described later means that the antenna configuration is configured identically for all TRPs, and the PMI (e.g., SD basis) and RI restrictions are also configured identically for all TRPs. In addition, the value of the parameter set (e.g., L, beta, pv, etc.) and R (i.e., the number of PMI SBs per CQI subband (SB)) constituting each Type 2 codebook are also configured in common for all TRPs.

Table 8 shows an example in which antenna configuration and/or codebook subset restrictions are configured in common TRP and an example of a parameter set constituting a Type 2 codebook (eg, see Table 5.2.2.2.6-1 of TS 38.214) indicates.

Configuration based on the above-described TRP common has the effect of reducing complexity in terms of simplifying the configuration of the base station.

Unlike the above-described example method, RI restriction is configured in common TRP, but in consideration of CJT performance improvement, the method of configuring PMI restriction to be TRP specific may be considered. In the case of the corresponding method, there is an effect of improving the flexibility of CJT configuration. For example, in the case of PMI restriction, since the physical location of the TRP/panel participating in CJT may be different, it may be effective to configure the PMI restriction to be TRP specific in terms of interference management.

Table 9 is an example of configuring the RI restriction in common TRP, and configuring the PMI restriction in TRP-specific.

TABLE 8

```
CodebookConfig-r18 ::=             SEQUENCE {
    codebookType                       CHOICE {
        type2                              SEQUENCE {
            subType                            CHOICE {
                typeII-MTRP-r18                    SEQUENCE {
                    ng-n1-n2                                            CHOICE {
                        two-two-one-TypeII-MTRP-Restriction             BIT STRING (SIZE (x1)),
                        two-four-one-TypeII-MTRP-Restriction            BIT STRING (SIZE (x2)),
                        four-two-one-TypeII-MTRP-Restriction            BIT STRING (SIZE (x3)),
                        two-two-two-TypeII-MTRP-Restriction             BIT STRING (SIZE (x4)),
                        two-eight-one-TypeII-MTRP-Restriction           BIT STRING (SIZE (x5)),
                        four-four-one-TypeII-MTRP-Restriction           BIT STRING (SIZE (x6)),
                        two-four-two-TypeII-MTRP-Restriction            BIT STRING (SIZE (x7)),
                        four-two-two-TypeII-MTRP-Restriction            BIT STRING (SIZE (x8))
                    },
                    typeII-RI-Restriction-r18          BIT STRING (SIZE(4))
            },
            numberOfPMI-SubbandsPerCQI-Subband-r18 INTEGER (1..2),
            paramCombination-r18           INTEGER (1..8)
        }
    }
}
```

Table 5.2.2.2.6-1: Codebook parameter configurations for L, $\beta$ and $p_v$

| paramCombination-r16 | L | $p_v$ | | $\beta$ |
|---|---|---|---|---|
| | | $v \in \{1, 2\}$ | $v \in \{3, 4\}$ | |
| 1 | 2 | 1/4 | 1/8 | 1/4 |
| 2 | 2 | 1/4 | 1/8 | 1/2 |
| 3 | 4 | 1/4 | 1/8 | 1/4 |
| 4 | 4 | 1/4 | 1/8 | 1/2 |
| 5 | 4 | 1/4 | 1/4 | 3/4 |
| 6 | 4 | 1/2 | 1/4 | 1/2 |

TABLE 9

```
CodebookConfig-r18 ::=              SEQUENCE {
    codebookType                        CHOICE {
        type2                               SEQUENCE {
            subType                             CHOICE {
                typeII-MTRP-r18                     SEQUENCE  {
                    Num-TRP                             CHOICE {
                        two                                 SEQUENCE {
                            TRPid                               CHOICE {
                                One                                 SEQUENCE  {
                                    n1-n2                               CHOICE {
                                        two-one-MTRP-Restriction            BIT STRING (SIZE (x1)),
                                        two-two-MTRP-Restriction            BIT STRING (SIZE (x2)),
                                        four-one-MTRP-Restriction           BIT STRING (SIZE (x3)),
                                        eight-one-MTRP-Restriction          BIT STRING (SIZE (x4)),
                                    }
                                    paramCombination-r18                INTEGER (1..8)
                                Two
                                    n1-n2                               CHOICE {
                                        two-one-MTRP-Restriction            BIT STRING (SIZE (x5))
                                        two-two-MTRP-Restriction            BIT STRING (SIZE (x6)),
                                        four-one-MTRP-Restriction           BIT STRING (SIZE (x7)),
                                        eight-one-MTRP-Restriction          BIT STRING (SIZE (x8)),
                                    }
                                    paramCombination-r18                INTEGER (1..8)
                                }
                        four
                            TRPid                               CHOICE {
                                One                                 SEQUENCE  {
                                    n1-n2                               CHOICE {
                                        two-one-MTRP-Restriction            BIT STRING (SIZE (x1)),
                                        two-two-MTRP-Restriction            BIT STRING (SIZE (x2)),
                                        four-one-MTRP-Restriction           BIT STRING (SIZE (x3)),
                                        eight-one-MTRP-Restriction          BIT STRING (SIZE (x4)),
                                    }
                                    paramCombination-r18                INTEGER (1..8)
                                Two
                                    n1-n2                               CHOICE {
                                        two-one-MTRP-Restriction            BIT STRING (SIZE (x5)),
                                        two-two-MTRP-Restriction            BIT STRING (SIZE (x6)),
                                        four-one-MTRP-Restriction           BIT STRING (SIZE (x7)),
                                        eight-one-MTRP-Restriction          BIT STRING (SIZE (x8)),
                                    }
                                    paramCombination-r18                INTEGER (1..8)
                                }
                                Three
                                    n1-n2                               CHOICE {
                                        two-one-MTRP-Restriction            BIT STRING (SIZE (x5)),
                                        two-two-MTRP-Restriction            BIT STRING (SIZE (x6)),
                                        four-one-MTRP-Restriction           BIT STRING (SIZE (x7)),
                                        eight-one-MTRP-Restriction          BIT STRING (SIZE (x8)),
                                    }
                                    paramCombination-r18                INTEGER (1..8)
                                }
                                Four
                                    n1-n2                               CHOICE {
                                        two-one-MTRP-Restriction            BIT STRING (SIZE (x5)),
                                        two-two-MTRP-Restriction            BIT STRING (SIZE (x6)),
                                        four-one-MTRP-Restriction           BIT STRING (SIZE (x7)),
                                        eight-one-MTRP-Restriction          BIT STRING (SIZE (x8)),
                                    }
                                    paramCombination-r18                INTEGER (1..8)
                                }
                    typeII-RI-Restriction-r18       BIT STRING (SIZE(4))
                },
                numberOfPMI-SubbandsPerCQI-Subband-r18 INTEGER (1..2),
            }
        }
    }
}
```

Embodiment 2

This embodiment relates to a CSI-RS configuration method for supporting CJT performance based on a codebook or the like.

For DL data transmission through a plurality of TRPs, the UE calculates CSI by measuring RS (eg, CSI-RS, DMRS, etc.) from the plurality of TRPs, and reports the CSI to the base station. At this time, in the case of RS, particularly CSI-RS, since a plurality of TRPs/panels are associated, there may be various methods for configuring the CSI-RS, and may include the following exemplary methods.

Scheme 1. One representative TRP may configure resources as many as the total number of CSI-RS ports for CJT, and according to a predefined rule (i.e., a specific rule), transmit CSI-RS to the terminal by mapping port (i.e., CSI-RS port) for each TRP/Remote Radio Head (RRH). Accordingly, the terminal may receive/measure the CSI-RS based on the CSI-RS port index according to the configuration.

Method 2. CSI-RS for CJT may be configured and transmitted for each TRP/RRH. In this case, the terminal may classify the CSI-RS transmitted for each TRP according to a predefined rule (i.e., a specific rule), and perform measurement on the aggregated CSI-RS.

Embodiment 2-1

The above-described scheme 1 is an embodiment of a scheme in which one representative TRP performs CSI-RS configuration. For example, the 24-port CSI-RS may be configured by dividing up to 12 ports (i.e., 12 ports each) for each TRP/RRH. In this case, the identification information (e.g., ID) and/or sequence identification information in the CSI resource configuration (e.g. CSI-ResourceConfig) may be shared for a plurality of TRP/RRH, and an indicator for the number of TRPs and/or the number of ports for each TRP may be indicated in CSI-RS resource mapping (eg CSI-RS-ResourceMapping). In addition, the resource mapping for each TRP may be sequentially mapped with the lowest index order (or the highest index order) of a TRP index, a cell identifier, CORESETPoolIndex, (SSB) beam index, and/or a TCI state index. CSI-RS port indexing in the current NR system is based on sequential port mapping for each CDM group as shown in Table 10 below (e.g., refer to the TS 38.211 standard).

TABLE 10

The UE shall assume that a CSI-RS is transmitted using antenna ports p numbered according to
$$p = 3000 + s + jL;$$
$$j = 0, 1, \ldots, N/L - 1$$
$$s = 0, 1, \ldots, L - 1;$$
where s is the sequence index provided by Tables 7.4.1.5.3-2 to 7.4.1.5.3-5, $L \in \{1, 2, 4, 8\}$ is the CDM group size, and N is the number of CSI-RS ports.

In the case of CJT related to the method proposed in the present disclosure, for each TRP/RRH, a single or a plurality of CDM groups may be sequentially divided and mapped.

Figure 9:
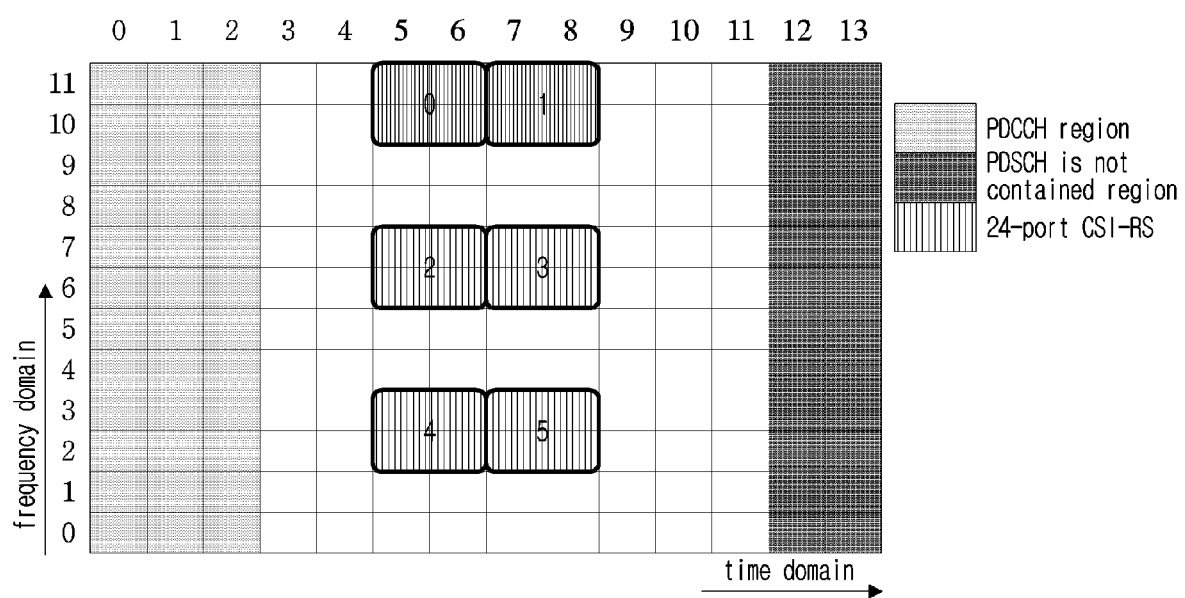
FIG. 9 illustrates a channel state information-reference signal (CSI-RS) port configuration in a wireless communication system to which the present disclosure may be applied.

FIG. 9 illustrates a CSI-RS port configuration in a wireless communication system to which the present disclosure may be applied.

Referring to FIG. 9, 24 CSI-RS ports may be configured for the terminal, and may be divided into 6 CDM groups and configured. For example, as shown in FIG. 9, the 24 CSI-RS ports may be divided into a 2-by-2 CDM group unit composed of 4 CSI-RS ports, and a total of 6 CDM groups (i.e., CDM groups 0 to 5) may be configured.

At this time, each TRP/RRH may perform CSI-RS port indexing based on a specific rule. For example, for TRP 1, 2-by-2 CDM groups (0, 1, 2) or (0, 2, 4) may be mapped, and for TRP 2, 2-by-2 CDM groups (3, 4), 5) or (1, 3, 5) may be mapped. The specific rule may be promised in advance between the base station and the terminal (by standards, etc.), or the base station may configure information for the specific rule to the terminal in advance.

Scheme 1 may operate in conjunction with the aforementioned antenna port and/or codebook parameter configuration (e.g., the proposed method of Embodiment 1). That is, since the terminal may recognize the number of TRPs and the number of CSI-RS ports for each TRP through antenna port and/or codebook parameter configuration, CSI-RS transmission/measurement operation may be performed by mapping one CSI-RS resource in the above scheme 1 to a plurality of TRPs (i.e., a plurality of TRPs). In other words, since the base station may transfer information on the number of TRPs and the number of CSI-RS ports for each TRP through antenna port and/or codebook parameter configuration to the terminal, the base station may perform M-TRP based CSI-RS transmission by mapping one CSI-RS resource to a plurality of TRPs (i.e., a plurality of TCI states), and the corresponding terminal may perform reception/measurement for the CSI-RS.

For example, the number of TRPs may be the same as the above-described Ng value, and the number of CSI-RS ports for each TRP may be the same as N1*N2*P. Here, P denotes polarization, and in the case of X-pol, the P value is set to 2, and in the case of co-pol, the P value is set to 1. In addition, the Ng value corresponding to the number of TRPs is only one specific example, and of course, other types of parameters indicating the number of TRPs may be used.

In addition, in the case of mapping between the CSI-RS port, CSI-RS resource, and/or TRP/panel (e.g., TCI state), in addition to the above-described method 1, the base station may configure/indicate to the terminal information for the corresponding mapping. For example, the base station may designate/indicate to the terminal in which order to map the ports/resources/panels through a report activation/triggering command (via MAC-CE and/or DCI, etc.).

As a specific example of the above-described method 1, a 16-port CSI-RS may be configured to the terminal, two TCI states may be configured in the corresponding CSI-RS resource, and the number of TRPs in the codebook configuration (e.g., Ng value) may be configured to two. Here, the number of CSI-RS ports of the first TRP and the number of CSI-RS ports of the second TRP may be configured to 8 (i.e., (N1, N2, P)=(2, 2, 2)), respectively.

In this case, since the number of TRPs is two, 16-port CSI-RS may be divided into two port groups corresponding to each TRP (port group). In addition, since the number of CSI-RS ports of each TRP is 8, each port group consists of 8 different CSI-RS ports.

For example, the port group may be grouped based on the CDM group as in the above-described proposed method.

As another example, when the P value is 1, the groups may be sequentially grouped from the port of the lowest index (i.e., the lowest port). That is, CSI-RS ports 0 to 7 may be configured as a first port group, and the remaining CSI-RS ports may be configured as a second port group.

As another example, when the P value is 2, a port group including a half of $N_1*N_2*P$ numbers in order from the CSI-RS port of the lower index among higher half CSI-RS ports corresponding to V-pol (or pol corresponding to "\" slant) (i.e., CSI-RS ports 8 to 15) and a half of $N_1*N_2*P$ numbers in order from the CSI-RS port of the lower index among lower half CSI-RS ports corresponding to H-pol (or pol corresponding to "/" slant) (i.e., CSI-RS ports 0 to 7) may be configured. As a result, CSI-RS ports 0 to 3 and 8 to 11 may be configured as a first port group, and CSI-RS ports 4 to 7 and 12 to 15 may be configured as a second port group.

As another example, the configuration of the port group may be based on a TRP priority mapping scheme. As a specific example, CSI-RS ports 0 to 7 correspond to the first TRP (TRP 1), and CSI-RS ports 0 to 3 correspond to H-pol (or pol corresponding to "/" slant), CSI-RS ports 4 to 7 may correspond to V-pol (or pol corresponding to "\" slant). In addition, CSI-RS ports 8 to 15 correspond to the second TRP (TRP 2), and CSI-RS ports 8 to 11 correspond to H-pol (or pol corresponding to "/" slant), and CSI-RS ports 12 to 15 may correspond to V-pol (or pol corresponding to "\" slant). Accordingly, the first port group is configured with CSI-RS ports 0 to 7, the second port group is configured with CSI-RS ports 8 to 15, and each port group may be mapped to correspond to each TRP. In this case, the first port group may be mapped to the first TCI state and the second port group may be mapped to the second TCI state based on a predefined rule or the like. Alternatively, the base station may configure/indicate information on the mapping scheme between the port group and the TCI state, through an activation/triggering command (via MAC-CE and/or DCI, etc.).

Embodiment 2-2

On the other hand, the above-described scheme 2 is an embodiment of a method in which CSI resource configuration (e.g., CSI-ResourceConfig) is separately configured for each TRP (e.g., by CORESET pool id/index). In this case, the terminal may configure/constitute the CSI-RS for CJT by aggregating the resources (i.e., CSI-RS resources) for each TRP.

At this time, each CSI-RS port mapping may be indexed/mapped in the order of the lowest index (or, the highest index) of a TRP index, a cell identifier, CORESETPoolIndex, or a (SSB) beam index. Alternatively, CSI-RS port mapping may be performed in the order of the TCI state index or the TCI state configured in one CSI-RS resource (i.e., an aggregated CSI-RS resource). That is, in Equation 3 below, the i value may be mapped in the order of the lowest index (or highest index). Alternatively, the order of the i index may be configured/indicated by a base station or the like.

Equation 3 below represents an equation for port indexing in the case of following the above-described method.

$$p = 3000 + iN + p' \quad \text{[Equation 3]}$$

$$\text{where } p = s + jL, j = 0, 1, \ldots \cdot \frac{N}{L} - 1,$$

$$s = 0, 1, \cdots, L-1, i = 0, \cdots, N_{MTRP}$$

In Equation 3, $N_{MTRP}$ represents the number of TRPs participating in CJT, N represents the number of CSI-RS ports transmitted for each TRP, and L represents the number of CDM groups. Referring to Equation 3 above, CSI-RS resources for each TRP participating in CJT (e.g., M CSI-RS resources) may be configured/defined to have the same number of CSI-RS ports.

In the above-described proposed method, the terminal may not expect that a plurality of CSI-RS configurations are overlapped/collided. In addition, it may be preferable that the time domain behavior (e.g., periodic, semi-persistent, aperiodic) of the CSI-RS resource configured for CJT be identically configured.

In relation to the above-described method 2, as another CSI-RS indexing method, a method of mapping in the order of resource IDs of CSI-RS/SSB (e.g., from lower (or highest) ID) may be applied. And/or, the base station may configure in which order to map ports for a plurality of resources (i.e., a plurality of CSI resources) in a report configuration (e.g., CSI-ReportConfig) or measurement configuration. And/or, the base station may designate/indicate the terminal in which order to map ports/resources/panels through a report activation/triggering command (via MAC-CE and/or DCI, etc.).

As an example, a method using MAC-CE may correspond to a dynamic TRP swapping method. In this case, as a codebook design and CSI reporting method for CJT, a scheme in which the terminal performs reporting CSI to a representative TRP (e.g., a reference TRP, a TRP having the lowest/highest CORESET pool id/index, etc.) and the representative TRP shares the reported CSI with other TRPs participating in CJT may be considered. Alternatively, as a codebook design and CSI reporting method for CJT, a scheme in which the terminal transmits CSI for each TRP corresponding to each TRP may be considered. In the latter case, it may be different depending on the codebook design, but if there is a difference in the payload for each TRP according to the TRP specific codebook parameter, there may be an advantage that the network may adjust the payload through dynamic TRP swapping.

Embodiment 3

This embodiment relates to a method for configuring/indicating a TCI state for a CSI-RS resource in supporting CJT based on a single frequency network (SFN) framework.

For example, two TRPs having two Tx antennas (2TX) may support the CJT scheme for a terminal having two Rx antennas (2RX).

Figure 10:
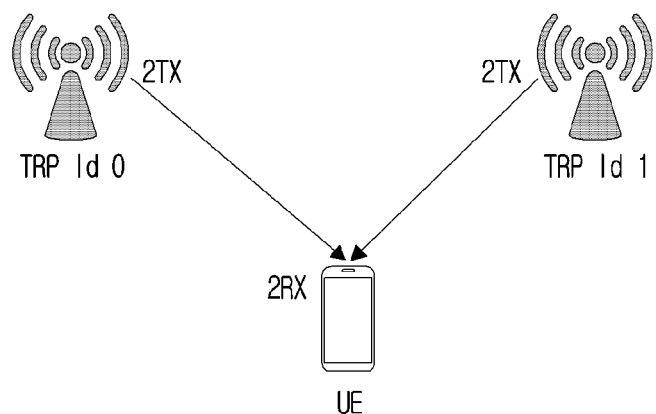
FIG. 10 illustrates a Single Frequency Network (SFN)-based Coherent Joint Transmission (CJT) scheme support in a wireless communication system to which the present disclosure may be applied.
Figure 10:
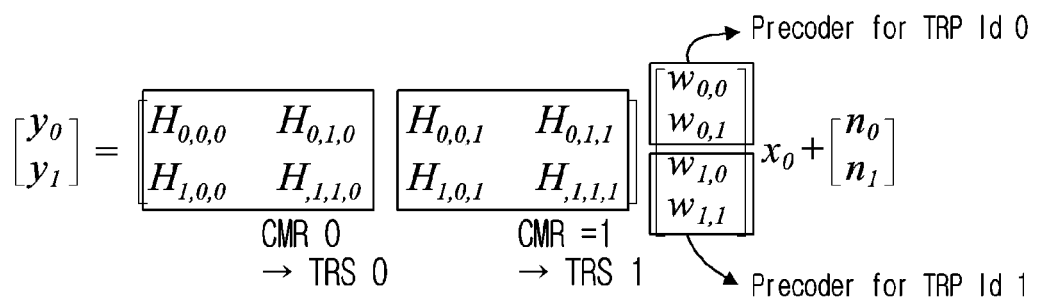

FIG. 10 illustrates SFN-based CJT scheme support in a wireless communication system to which the present disclosure may be applied.

Referring to FIG. 10, three types of TRS (Tracking RS) may be supported, and specifically, a first TRS (e.g., TRS 0) that is a TRP-specific TRS for a first TRP (e.g., TRP id 0), a second TRS (e.g., TRS 1) that is a TRP-specific TRS for a second TRP (e.g., TRP id 1) and a third TRS (e.g., TRS 2) that is an SFNed TRS for the first TRP/second TRP may be considered.

In the equation shown in FIG. 10, $y_i$ represents the received signal to the i-th Rx antenna of the terminal, $n_i$ represents the noise component of the i-th Rx antenna of the terminal, and $H_{i,i,k}$ represents the channel component between the i-th Rx antenna of the terminal from the j-th Tx antenna of the k-th TRP, and $w_{k,j}$ represents the precoder component corresponding to the j-th Tx antenna of the k-th TRP.

In the SFN-based CJT scheme as described above, the TCI state for the CSI-RS resource may be configured/indicated to the terminal based on at least one of the following methods.

(Method 1) For a plurality of CSI-RS resources, a method of configuring a TCI state corresponding to a specific CSI-RS resource to follow for all of the plurality of CSI-RS resources may be considered. For example, when the first channel measurement resource (CMR) corresponds to the first TCI state and the second CMR corresponds to the second TCI state, it may be defined/configured/indicated that all CMRs follow the TCI state of a specific CMR (e.g., the first CMR). That is, both the first CMR and the second CMR may be defined/configured/indicated to apply the first TCI state. According to method 1, when it is not easy to change the TCI state as the CSI-RS resource is periodically configured, there is an advantage that the same TCI state value may be applied to a plurality of CMRs based on a predefined rule/configuration of the base station, etc.

(Method 2) For a plurality of CSI-RS resources, a method of configuring a single TCI state value may be considered. For example, only the first TCI state may be configured for the first CMR/second CMR.

(Method 3) A method of configuring the same TCI state value for a plurality of CSI-RS resources may be considered. For example, a first TCI state or a second TCI state may be configured for the first CMR and the second CMR. That is, the terminal may not expect different TCI state values to be configured for the plurality of CSI-RS resources.

Also, referring to FIG. 10, in relation to the above-described proposed method, TRSs (e.g., TRS 0, TRS 1) may be mapped for each TRP for CMR, and a separate TRS (e.g., TRS 2) for the composed channel may be mapped through a plurality of CMRs for PDSCH reception. Therefore, when operating based on such SFNed TRS (e.g., TRS 2), since the base station considers only a single TCI state even when scheduling the PDSCH based on the CSI feedback, there is an advantage that no separate enhancement for the CJT PDSCH transmission is required in addition to codebook enhancement.

With respect to the methods described above in the present disclosure, it is obvious that each of the proposed methods (e.g., Embodiments 1 to 3) may be applied in combination. In addition, although the methods described above in the present disclosure have been described based on the CJT environment, the method(s) may also be applied/used to an environment based on dynamic point selection (DPS) and/or non-coherent joint transmission (NCJT).

In addition, with respect to the methods described above in the present disclosure, the proposed method(s) has been described based on a plurality of TRP transmissions, but it is also applicable to a plurality of panels or a plurality of beams within a single base station. Signals transmitted from different base stations/TRPs/panels/beams have different long-term fadings such as pathloss, average delay, average Doppler shift, etc. in the side of terminal reception, and/or, in the aspect that beams (e.g., QCL, the spatial Rx parameter, i.e., QCL type D in the TS 38.214 standard) to be applied by the terminal to reception may be different, it may be distinguished from a signal transmitted from the same base station/TRP/panel/beam. That is, antenna ports transmitted and received in the same TRP may be referred to as QCLed antenna ports (e.g., CSI-RS antenna ports within the same CSI-RS resource), and antenna ports transmitted and received in different TRPs may be referred to as non-QCLed antenna ports (e.g., CSI-RS antenna ports in different CSI-RS resources), and as such, the two types of antenna ports may be distinguished.

Figure 11:
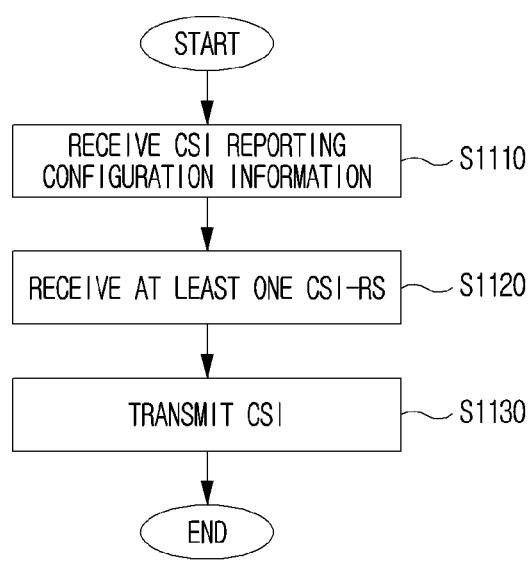
FIG. 11 is a diagram illustrating an operation of a terminal in a method for transmitting and receiving channel state information according to an embodiment of the present disclosure.

FIG. 11 is a diagram illustrating an operation of a terminal in a method for transmitting and receiving channel state information according to an embodiment of the present disclosure.

FIG. 11 illustrates an operation of operation of a terminal based on the previously proposed method (e.g., any one or a combination of Embodiments 1 to 3 and detailed embodiments thereof). The example of FIG. 11 is for convenience of description, and does not limit the scope of the present disclosure. Some step(s) illustrated in FIG. 11 may be omitted depending on circumstances and/or configuration. In addition, the terminal in FIG. 11 is only one example, and may be implemented as the apparatus illustrated in FIG. 13 below. For example, the processor 102/202 of FIG. 13 may control to transmit and receive channel/signal/data/information (e.g., RRC signaling, MAC CE, DCI for UL/DL scheduling, SRS, PDCCH, PDSCH, PUSCH, PUCCH, etc.) using the transceiver 106/206, and may control to store channel/signal/data/information to be transmitted or received in the memory 104/204.

Figure 13:
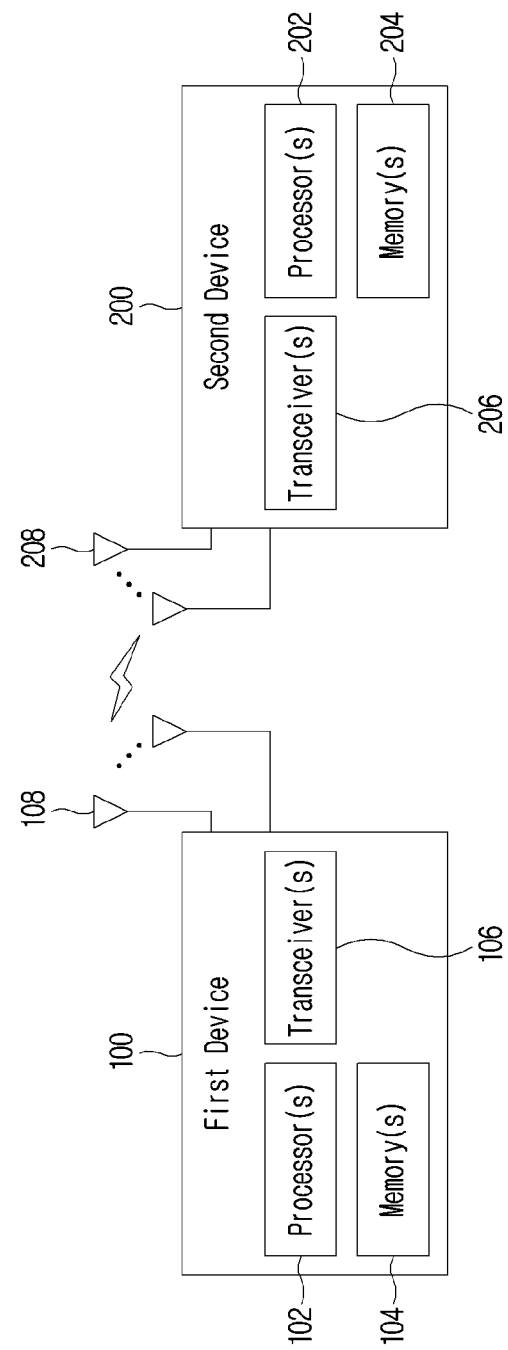
FIG. 13 is a diagram which illustrates a block diagram of a wireless communication device according to an embodiment of the present disclosure.

Also, the operation of FIG. 11 may be processed by one or more processors (102, 202) in FIG. 13, and the operation of FIG. 11 may be stored in a memory (e.g., one or more memories (104, 204) in FIG. 13, in the form of instructions/programs (e.g., instructions, executable code) for driving at least one processor (102, 202) in FIG. 13.

In addition, in the case of the operation of FIG. 11, some examples are described as an operation for two TRPs for convenience of explanation, but it is obvious that the contents described through FIG. 11 may be expanded and applied to an operation for two or more TRPs.

Referring to FIG. 11, in step S1110, the terminal may receive configuration information related to CSI reporting from a base station (e.g., a base station configured with at least one TRP, etc.).

The configuration information may include the above-described CSI-related operation, CSI-related resource configuration (e.g., resource setting, resource setting configuration, CSI-RS resource configuration, etc.), CSI report (e.g., CSI reportQuantity, etc.) and/or CSI calculation (e.g., configuration/definition of CPU occupancy), etc.

For example, as in the above-described embodiments (e.g., Embodiments 1 to 3), the configuration information in step S1110 may include a CSI-RS resource to be used for CSI reporting between the base station and the terminal, a configuration for CSI-RS resource mapping, CSI-RS port group-related information (e.g., the number of port groups, TRP-related information associated with the number of ports in the port group, etc.), antenna port-related configuration information, and codebook-related configuration information (e.g., codebook restriction parameter, etc.).

As a specific example, as in the above-described embodiment (e.g., embodiment 2 and detailed embodiment 2-1), when CSI reporting is performed based on a plurality of CSI-RS port groups associated with a single CSI-RS resource, the single CSI-RS resource may be determined based on single identification information in the CSI resource configuration included in the configuration information. In addition, a configuration for CSI-RS resource mapping included in the configuration information may include at least one of information representing/indicating the number of the plurality of CSI-RS port groups or information representing/indicating the number of CSI-RS ports included in each of the plurality of CSI-RS port groups.

Here, the plurality of CSI-RS port groups may be associated with at least one of a TRP index, a cell identifier, a CORESET pool index, or a TCI state index. In this regard, the number of the plurality of CSI-RS port groups may be determined based on the number of TRP indices, cell identifiers, CORESET pool indices, or TCI state indices related to the single CSI-RS resource.

Also, as an example, the plurality of CSI-RS port groups may be grouped in units of at least one code division multiplex (CDM) group.

As another example, when a polarization parameter (e.g., P) for the plurality of CSI-RS port groups is configured to 1, the plurality of CSI-RS port groups may be grouped in order from the CSI-RS port having the lowest index. As a specific example, if there is a 16-port CSI-RS resource and corresponding CSI-RS resource is related to two TRPs (e.g., 2 TCI states), the first CSI-RS port group may be configured with CSI-RS ports 0 to 7, and the second CSI-RS port group may be configured with CSI-RS ports 8 to 15.

As another example, when the polarization parameter for the plurality of CSI-RS port groups is configured to 2, each of the plurality of CSI-RS port groups may include a first CSI-RS port sub-group corresponding to a first pol (e.g., X-pol) and a second CSI-RS port sub-group corresponding to a second pol (e.g., V-pol). As a specific example, if there is a 16-port CSI-RS resource and the CSI-RS resource is related to two TRPs (e.g., 2 TCI states), the first CSI-RS port group may be configured with CSI-RS ports 0 to 3 corresponding to X-pol and CSI-RS ports 8 to 11 corresponding to V-pol, and the second CSI-RS port group may be configured with CSI-RS ports 4 to 7 corresponding to X-pol and CSI-RS ports 12 to 15 corresponding to V-pol. Alternatively, considering the TRP first mapping scheme, the first CSI-RS port group may be configured with CSI-RS ports 0 to 7 associated with the first TRP (e.g., the first TCI state, the first CORESET pool index, etc.), and the second CSI-RS port group may be configured with CSI-RS ports 8 to 15 associated with the second TRP (e.g., the second TCI state, the second CORESET pool index, etc.). In this case, CSI-RS ports 0 to 3 and 8 to 11 may be associated with X-pol, and CSI-RS ports 4 to 7 and 12 to 15 may be associated with V-pol.

In addition, as another specific example, when CSI-RS for each TRP is transmitted and received as in the above-described embodiment (e.g., embodiment 2 and detailed embodiment 2-2), the configuration information may include configuration information for a CSI-RS resource for each TRP (e.g., first CSI resource configuration, second CSI resource configuration, etc.). In relation to the corresponding example, a channel measurement resource (CMR) for CSI acquisition may include a CSI-RS resource for each TRP (e.g., a first resource for the first CSI-RS, a second resource for the second CSI-RS, etc.).

At this time, the CSI-RS resource for each TRP may be configured to be associated with a different CORESET pool index. As an example, the first CSI resource configuration may be associated with a first CORESET pool index, and the second CSI resource configuration may be associated with a second CORESET pool index.

In addition, in relation to the corresponding example, CSI-RS resources for each TRP may not overlap/collide with each other. That is, at least one CSI-RS resource included in the first CSI resource configuration may not overlap with the at least one CSI-RS resource included in the second CSI resource configuration. In addition, a type of time domain behavior (i.e., an operation type in the time domain) configured for the first resource may be the same as a type of time domain behavior configured for the second resource.

In addition, in relation to the corresponding example, the CSI-RS port index for the CMR may be sequentially determined, based on the lowest/highest index of at least one of a TRP index, a cell identifier, a CORESET pool index, or a TCI state index. In addition, the CSI-RS port index for the CMR may be based on the number of CORESET pool indexes associated with the CMR, the number of CSI-RS ports associated with each CORESET pool index, and the number of CDM groups (e.g., refer the Equation 3). The above-described CSI-RS resources for each TRP (e.g., a first resource, a second resource, etc.) may be configured to have the same number of CSI-RS ports. In addition, the CSI-RS port index for the CMR may be sequentially determined, based on the lowest/highest index of a CSI-RS resource ID or SSB resource ID.

In addition, the configuration information may include information related to the mapping of the CSI-RS port index for the CMR. Alternatively, the corresponding information may be transferred to the terminal by the base station through/via MAC-CE and/or DCI.

In step S1110, the terminal may receive at least one CSI-RS from the base station.

For example, as in the above-described embodiments (e.g., Embodiments 1 to 3), the terminal may receive and measure CSI-RS based on an antenna port and CSI-RS resource related configuration(e.g., CSI-RS resource, CSI-RS port/port group, etc.) based on predefined rules and/or configuration by the base station.

As a specific example, as in the above-described embodiment (e.g., embodiment 2 and detailed embodiment 2-1), the at least one CSI-RS may be received based on a plurality of CSI-RS port groups associated with a single CSI-RS resource, based on the single CSI-RS resource configured by configuration information (e.g., configuration information in step S1110) and predefined rule.

In addition, as another specific example, as in the above-described embodiment (e.g., embodiment 2 and detailed embodiment 2-2), the terminal may receive a first CSI-RS and a second CSI-RS from the base station, based on a CSI-RS resource for each TRP (e.g., the first resource, the second resource, etc.) configured by configuration information (e.g., setting information in step S1110).

In step S1130, the terminal may transmit the CSI calculated based on the configuration information and/or the at least one CSI-RS to the base station.

For example, as in the above-described embodiments (e.g., embodiments 1 to 3), the terminal may determine/calculate CSI based on information configured regarding CSI reporting and/or reception/measurement for a CSI-RS transmitted by the base station, and the terminal may report the corresponding CSI to the base station.

In addition, as a specific example, as in the above-described embodiment (e.g., embodiment 2 and detailed embodiment 2-2), a channel measurement resource (CMR) for CSI acquisition may be configured by aggregating CSI-RS resources for each TRP (e.g., first resource, second resource, etc.), and the terminal may acquire and transmit CSI based on the corresponding CMR (e.g., first CSI-RS and second CSI-RS).

In addition, with respect to the terminal operation in FIG. 11, the association relationship between a plurality of CSI-RS port groups in the above-described example and at least one of a TRP index, a cell identifier, a CORESET pool index, or a TCI state index may be determined based on the predefined rule.

Alternatively, although not shown in FIG. 11, information on the association relationship between the plurality of CSI-RS port groups and at least one of a TRP index, a cell identifier, a CORESET pool index, or a TCI state index may be transferred to the terminal by the base station through indication information on at least one of activation or triggering of the CSI report. In this case, the indication information may be transferred through MAC-CE and/or DCI.

Figure 12:
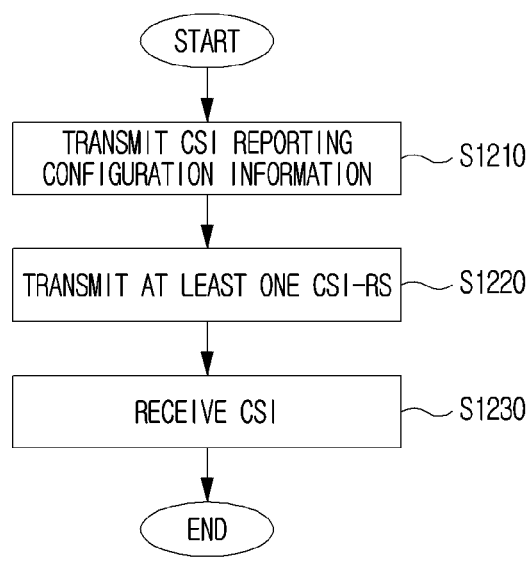
FIG. 12 is a diagram illustrating an operation of a base station for a method for transmitting and receiving channel state information according to an embodiment of the present disclosure.

FIG. 12 is a diagram illustrating an operation of a base station in a method for transmitting and receiving channel state information according to an embodiment of the present disclosure.

FIG. 12 illustrates an operation of operation of a base station based on the previously proposed method (e.g., any one or a combination of Embodiments 1 to 3 and detailed embodiments thereof). The example of FIG. 13 is for convenience of description, and does not limit the scope of the present disclosure. Some step(s) illustrated in FIG. 12 may be omitted depending on circumstances and/or configuration. In addition, the base station in FIG. 12 is only one example, and may be implemented as the apparatus illustrated in FIG. 13 below. For example, the processor 102/202 of FIG. 13 may control to transmit and receive channel/signal/data/information (e.g., RRC signaling, MAC CE, DCI for UL/DL scheduling, SRS, PDCCH, PDSCH, PUSCH, PUCCH, etc.) using the transceiver 106/206, and may control to store channel/signal/data/information to be transmitted or received in the memory 104/204.

Also, the operation of FIG. 12 may be processed by one or more processors (102, 202) in FIG. 13, and the operation of FIG. 12 may be stored in a memory (e.g., one or more memories (104, 204) in FIG. 13, in the form of instructions/programs (e.g., instructions, executable code) for driving at least one processor (102, 202) in FIG. 13.

In addition, in the case of the operation of FIG. 12, some examples are described as an operation for two TRPs for convenience of explanation, but it is obvious that the contents described through FIG. 12 may be expanded and applied to an operation for two or more TRPs.

Referring to FIG. 12, in step S1210, the base station (e.g., a base station configured with at least one TRP, etc.) may transmit configuration information related to CSI reporting to the terminal.

The configuration information may include the above-described CSI-related operation, CSI-related resource configuration (e.g., resource setting, resource setting configuration, CSI-RS resource configuration, etc.), CSI report (e.g., CSI reportQuantity, etc.) and/or CSI calculation (e.g., configuration/definition of CPU occupancy), etc.

For example, as in the above-described embodiments (e.g., Embodiments 1 to 3), the configuration information in step S1210 may include a CSI-RS resource to be used for CSI reporting between the base station and the terminal, a configuration for CSI-RS resource mapping, CSI-RS port group-related information (e.g., the number of port groups, TRP-related information associated with the number of ports in the port group, etc.), antenna port-related configuration information, and codebook-related configuration information (e.g., codebook restriction parameter, etc.).

As a specific example, as in the above-described embodiment (e.g., embodiment 2 and detailed embodiment 2-1), when CSI reporting is performed based on a plurality of CSI-RS port groups associated with a single CSI-RS resource, the single CSI-RS resource may be determined based on single identification information in the CSI resource configuration included in the configuration information. In addition, a configuration for CSI-RS resource mapping included in the configuration information may include at least one of information representing/indicating the number of the plurality of CSI-RS port groups or information representing/indicating the number of CSI-RS ports included in each of the plurality of CSI-RS port groups.

Here, the plurality of CSI-RS port groups may be associated with at least one of a TRP index, a cell identifier, a CORESET pool index, or a TCI state index. In this regard, the number of the plurality of CSI-RS port groups may be determined based on the number of TRP indices, cell identifiers, CORESET pool indices, or TCI state indices related to the single CSI-RS resource.

Also, as an example, the plurality of CSI-RS port groups may be grouped in units of at least one code division multiplex (CDM) group.

As another example, when a polarization parameter (e.g., P) for the plurality of CSI-RS port groups is configured to 1, the plurality of CSI-RS port groups may be grouped in order from the CSI-RS port having the lowest index. As a specific example, if there is a 16-port CSI-RS resource and corresponding CSI-RS resource is related to two TRPs (e.g., 2 TCI states), the first CSI-RS port group may be configured with CSI-RS ports 0 to 7, and the second CSI-RS port group may be configured with CSI-RS ports 8 to 15.

As another example, when the polarization parameter for the plurality of CSI-RS port groups is configured to 2, each of the plurality of CSI-RS port groups may include a first CSI-RS port sub-group corresponding to a first pol (e.g., X-pol) and a second CSI-RS port sub-group corresponding to a second pol (e.g., V-pol). As a specific example, if there is a 16-port CSI-RS resource and the CSI-RS resource is related to two TRPs (e.g., 2 TCI states), the first CSI-RS port group may be configured with CSI-RS ports 0 to 3 corresponding to X-pol and CSI-RS ports 8 to 11 corresponding to V-pol, and the second CSI-RS port group may be configured with CSI-RS ports 4 to 7 corresponding to X-pol and CSI-RS ports 12 to 15 corresponding to V-pol. Alternatively, considering the TRP first mapping scheme, the first CSI-RS port group may be configured with CSI-RS ports 0 to 7 associated with the first TRP (e.g., the first TCI state, the first CORESET pool index, etc.), and the second CSI-RS port group may be configured with CSI-RS ports 8 to 15 associated with the second TRP (e.g., the second TCI state, the second CORESET pool index, etc.). In this case, CSI-RS ports 0 to 3 and 8 to 11 may be associated with X-pol, and CSI-RS ports 4 to 7 and 12 to 15 may be associated with V-pol.

In addition, as another specific example, when CSI-RS for each TRP is transmitted and received as in the above-described embodiment (e.g., embodiment 2 and detailed embodiment 2-2), the configuration information may include configuration information for a CSI-RS resource for each TRP (e.g., first CSI resource configuration, second CSI resource configuration, etc.). In relation to the corresponding example, a channel measurement resource (CMR) for CSI acquisition may include a CSI-RS resource for each TRP (e.g., a first resource for the first CSI-RS, a second resource for the second CSI-RS, etc.).

At this time, the CSI-RS resource for each TRP may be configured to be associated with a different CORESET pool index. As an example, the first CSI resource configuration may be associated with a first CORESET pool index, and the second CSI resource configuration may be associated with a second CORESET pool index.

In addition, in relation to the corresponding example, CSI-RS resources for each TRP may not overlap/collide with each other. That is, at least one CSI-RS resource included in the first CSI resource configuration may not overlap with the at least one CSI-RS resource included in the second CSI resource configuration. In addition, a type of time domain behavior (i.e., an operation type in the time domain) configured for the first resource may be the same as a type of time domain behavior configured for the second resource.

In addition, in relation to the corresponding example, the CSI-RS port index for the CMR may be sequentially determined, based on the lowest/highest index of at least one of a TRP index, a cell identifier, a CORESET pool index, or a TCI state index. In addition, the CSI-RS port index for the CMR may be based on the number of CORESET pool indexes associated with the CMR, the number of CSI-RS ports associated with each CORESET pool index, and the number of CDM groups (e.g., refer the Equation 3). The above-described CSI-RS resources for each TRP (e.g., a first resource, a second resource, etc.) may be configured to have the same number of CSI-RS ports. In addition, the CSI-RS port index for the CMR may be sequentially determined, based on the lowest/highest index of a CSI-RS resource ID or SSB resource ID.

In addition, the configuration information may include information related to the mapping of the CSI-RS port index for the CMR. Alternatively, the corresponding information may be transferred to the terminal by the base station through/via MAC-CE and/or DCI.

In step S1210, the base station may transmit at least one CSI-RS to the terminal.

For example, as in the above-described embodiments (e.g., Embodiments 1 to 3), the terminal may receive and measure CSI-RS based on an antenna port and CSI-RS resource related configuration(e.g., CSI-RS resource, CSI-RS port/port group, etc.) based on predefined rules and/or configuration by the base station.

As a specific example, as in the above-described embodiment (e.g., embodiment 2 and detailed embodiment 2-1), the at least one CSI-RS may be transmitted based on a plurality of CSI-RS port groups associated with a single CSI-RS resource, based on the single CSI-RS resource configured by configuration information (e.g., configuration information in step S1110) and predefined rule.

In addition, as another specific example, as in the above-described embodiment (e.g., embodiment 2 and detailed embodiment 2-2), the base station may transmit a first CSI-RS and a second CSI-RS to the terminal, based on a CSI-RS resource for each TRP (e.g., the first resource, the second resource, etc.) configured by configuration information (e.g., setting information in step S1110).

In step S1230, the base station may receive the CSI calculated (by the terminal) based on the configuration information and/or the at least one CSI-RS from the terminal.

For example, as in the above-described embodiments (e.g., embodiments 1 to 3), the terminal may determine/calculate CSI based on information configured regarding CSI reporting and/or reception/measurement for a CSI-RS transmitted by the base station, and the base station may receive the corresponding CSI from the terminal.

In addition, as a specific example, as in the above-described embodiment (e.g., embodiment 2 and detailed embodiment 2-2), a channel measurement resource (CMR) for CSI acquisition may be configured by aggregating CSI-RS resources for each TRP (e.g., first resource, second resource, etc.), and the base station may receive CSI acquired based on the corresponding CMR (e.g., first CSI-RS and second CSI-RS) from the terminal.

In addition, with respect to the base station operation in FIG. 12, the association relationship between a plurality of CSI-RS port groups in the above-described example and at least one of a TRP index, a cell identifier, a CORESET pool index, or a TCI state index may be determined based on the predefined rule.

Alternatively, although not shown in FIG. 12, information on the association relationship between the plurality of CSI-RS port groups and at least one of a TRP index, a cell identifier, a CORESET pool index, or a TCI state index may be transferred to the terminal by the base station through indication information on at least one of activation or triggering of the CSI report. In this case, the indication information may be transferred through MAC-CE and/or DCI.

General Device to which the Present Disclosure May be Applied

FIG. 13 illustrates a block diagram of a wireless communication device according to an embodiment of the present disclosure.

In reference to FIG. 13, a first wireless device 100 and a second wireless device 200 may transmit and receive a wireless signal through a variety of radio access technologies (e.g., LTE, NR).

A first wireless device 100 may include one or more processors 102 and one or more memories 104 and may additionally include one or more transceivers 106 and/or one or more antennas 108. A processor 102 may control a memory 104 and/or a transceiver 106 and may be configured to implement description, functions, procedures, proposals, methods and/or operation flow charts disclosed in the present disclosure. For example, a processor 102 may transmit a wireless signal including first information/signal through a transceiver 106 after generating first information/signal by processing information in a memory 104. In addition, a processor 102 may receive a wireless signal including second information/signal through a transceiver 106 and then store information obtained by signal processing of second information/signal in a memory 104. A memory 104 may be connected to a processor 102 and may store a variety of information related to an operation of a processor 102. For example, a memory 104 may store a software code including commands for performing all or part of processes controlled by a processor 102 or for performing description, functions, procedures, proposals, methods and/or operation flow charts disclosed in the present disclosure. Here, a processor 102 and a memory 104 may be part of a communication modem/circuit/chip designed to implement a wireless communication technology (e.g., LTE, NR). A transceiver 106 may be connected to a processor 102 and may transmit and/or receive a wireless signal through one or more antennas 108. A transceiver 106 may include a transmitter and/or a receiver. A transceiver 106 may be used together with a RF (Radio Frequency) unit. In the present disclosure, a wireless device may mean a communication modem/circuit/chip.

A second wireless device 200 may include one or more processors 202 and one or more memories 204 and may additionally include one or more transceivers 206 and/or one or more antennas 208. A processor 202 may control a memory 204 and/or a transceiver 206 and may be configured to implement description, functions, procedures, proposals, methods and/or operation flows charts disclosed in the present disclosure. For example, a processor 202 may generate third information/signal by processing information in a memory 204, and then transmit a wireless signal including third information/signal through a transceiver 206. In addition, a processor 202 may receive a wireless signal including fourth information/signal through a transceiver 206, and then store information obtained by signal processing of fourth information/signal in a memory 204. A memory 204 may be connected to a processor 202 and may store a variety of information related to an operation of a processor 202. For example, a memory 204 may store a software code including commands for performing all or part of processes controlled by a processor 202 or for performing description, functions, procedures, proposals, methods and/or operation flow charts disclosed in the present disclosure. Here, a processor 202 and a memory 204 may be part of a communication modem/circuit/chip designed to implement a wireless communication technology (e.g., LTE, NR). A transceiver 206 may be connected to a processor 202 and may transmit and/or receive a wireless signal through one or more antennas 208. A transceiver 206 may include a transmitter and/or a receiver. A transceiver 206 may be used together with a RF unit. In the present disclosure, a wireless device may mean a communication modem/circuit/chip.

Hereinafter, a hardware element of a wireless device 100, 200 will be described in more detail. It is not limited thereto, but one or more protocol layers may be implemented by one or more processors 102, 202. For example, one or more processors 102, 202 may implement one or more layers (e.g., a functional layer such as PHY, MAC, RLC, PDCP, RRC, SDAP). One or more processors 102, 202 may generate one or more PDUs (Protocol Data Unit) and/or one or more SDUs (Service Data Unit) according to description, functions, procedures, proposals, methods and/or operation flow charts included in the present disclosure. One or more processors 102, 202 may generate a message, control information, data or information according to description, functions, procedures, proposals, methods and/or operation flow charts disclosed in the present disclosure. One or more processors 102, 202 may generate a signal (e.g., a baseband signal) including a PDU, a SDU, a message, control information, data or information according to functions, procedures, proposals and/or methods disclosed in the present disclosure to provide it to one or more transceivers 106, 206. One or more processors 102, 202 may receive a signal (e.g., a baseband signal) from one or more transceivers 106, 206 and obtain a PDU, a SDU, a message, control information, data or information according to description, functions, procedures, proposals, methods and/or operation flow charts disclosed in the present disclosure.

One or more processors 102, 202 may be referred to as a controller, a micro controller, a micro processor or a micro computer. One or more processors 102, 202 may be implemented by a hardware, a firmware, a software, or their combination. In an example, one or more ASICs(Application Specific Integrated Circuit), one or more DSPs(Digital Signal Processor), one or more DSPDs(Digital Signal Processing Device), one or more PLDs(Programmable Logic Device) or one or more FPGAs(Field Programmable Gate Arrays) may be included in one or more processors 102, 202. Description, functions, procedures, proposals, methods and/or operation flow charts disclosed in the present disclosure may be implemented by using a firmware or a software and a firmware or a software may be implemented to include a module, a procedure, a function, etc. A firmware or a software configured to perform description, functions, procedures, proposals, methods and/or operation flow charts disclosed in the present disclosure may be included in one or more processors 102, 202 or may be stored in one or more memories 104, 204 and driven by one or more processors 102, 202. Description, functions, procedures, proposals, methods and/or operation flow charts disclosed in the present disclosure may be implemented by using a firmware or a software in a form of a code, a command and/or a set of commands.

One or more memories 104, 204 may be connected to one or more processors 102, 202 and may store data, a signal, a message, information, a program, a code, an instruction and/or a command in various forms. One or more memories 104, 204 may be configured with ROM, RAM, EPROM, a flash memory, a hard drive, a register, a cash memory, a computer readable storage medium and/or their combination. One or more memories 104, 204 may be positioned inside and/or outside one or more processors 102, 202. In addition, one or more memories 104, 204 may be connected to one or more processors 102, 202 through a variety of technologies such as a wire or wireless connection.

One or more transceivers 106, 206 may transmit user data, control information, a wireless signal/channel, etc. mentioned in methods and/or operation flow charts, etc. of the present disclosure to one or more other devices. One or more transceivers 106, 206 may receiver user data, control information, a wireless signal/channel, etc. mentioned in description, functions, procedures, proposals, methods and/or operation flow charts, etc. disclosed in the present disclosure from one or more other devices. For example, one or more transceivers 106, 206 may be connected to one or more processors 102, 202 and may transmit and receive a wireless signal. For example, one or more processors 102, 202 may control one or more transceivers 106, 206 to transmit user data, control information or a wireless signal to one or more other devices. In addition, one or more processors 102, 202 may control one or more transceivers 106, 206 to receive user data, control information or a wireless signal from one or more other devices. In addition, one or more transceivers 106, 206 may be connected to one or more antennas 108, 208 and one or more transceivers 106, 206 may be configured to transmit and receive user data, control information, a wireless signal/channel, etc. mentioned in description, functions, procedures, proposals, methods and/or operation flow charts, etc. disclosed in the present disclosure through one or more antennas 108, 208. In the present disclosure, one or more antennas may be a plurality of physical antennas or a plurality of logical antennas (e.g., an antenna port). One or more transceivers 106, 206 may convert a received wireless signal/channel, etc. into a baseband signal from a RF band signal to process received user data, control information, wireless signal/channel, etc. by using one or more processors 102, 202. One or more transceivers 106, 206 may convert user data, control information, a wireless signal/channel, etc. which are processed by using one or more processors 102, 202 from a baseband signal to a RF band signal. Therefor, one or more transceivers 106, 206 may include an (analogue) oscillator and/or a filter.

Embodiments described above are that elements and features of the present disclosure are combined in a predetermined form. Each element or feature should be considered to be optional unless otherwise explicitly mentioned. Each element or feature may be implemented in a form that it is not combined with other element or feature. In addition, an embodiment of the present disclosure may include combining a part of elements and/or features. An order of operations described in embodiments of the present disclosure may be changed. Some elements or features of one embodiment may be included in other embodiment or may be substituted with a corresponding element or a feature of other embodiment. It is clear that an embodiment may include combining claims without an explicit dependency relationship in claims or may be included as a new claim by amendment after application.

It is clear to a person skilled in the pertinent art that the present disclosure may be implemented in other specific form in a scope not going beyond an essential feature of the present disclosure. Accordingly, the above-described detailed description should not be restrictively construed in every aspect and should be considered to be illustrative. A scope of the present disclosure should be determined by reasonable construction of an attached claim and all changes within an equivalent scope of the present disclosure are included in a scope of the present disclosure.

A scope of the present disclosure includes software or machine-executable commands (e.g., an operating system, an application, a firmware, a program, etc.) which execute an operation according to a method of various embodiments in a device or a computer and a non-transitory computer-readable medium that such a software or a command, etc. are stored and are executable in a device or a computer. A command which may be used to program a processing system performing a feature described in the present disclosure may be stored in a storage medium or a computer-readable storage medium and a feature described in the present disclosure may be implemented by using a computer program product including such a storage medium. A storage medium may include a high-speed random-access memory such as DRAM, SRAM, DDR RAM or other random-access solid state memory device, but it is not limited thereto, and it may include a nonvolatile memory such as one or more magnetic disk storage devices, optical disk storage devices, flash memory devices or other non-volatile solid state storage devices. A memory optionally includes one or more storage devices positioned remotely from processor(s). A memory or alternatively, nonvolatile memory device(s) in a memory include a non-transitory computer-readable storage medium. A feature described in the present disclosure may be stored in any one of machine-readable mediums to control a hardware of a processing system and may be integrated into a software and/or a firmware which allows a processing system to interact with other mechanism utilizing a result from an embodiment of the present disclosure. Such a software or a firmware may include an application code, a device driver, an operating system and an execution environment/container, but it is not limited thereto.

Here, a wireless communication technology implemented in a wireless device 100, 200 of the present disclosure may include Narrowband Internet of Things for a low-power communication as well as LTE, NR and 6G. Here, for example, an NB-IoT technology may be an example of a LPWAN(Low Power Wide Area Network) technology, may be implemented in a standard of LTE Cat NB1 and/or LTE Cat NB2, etc. and is not limited to the above-described name. Additionally or alternatively, a wireless communication technology implemented in a wireless device 100, 200 of the present disclosure may perform a communication based on a LTE-M technology. Here, in an example, a LTE-M technology may be an example of a LPWAN technology and may be referred to a variety of names such as an eMTC (enhanced Machine Type Communication), etc. For example, an LTE-M technology may be implemented in at least any one of various standards including 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M and so on and it is not limited to the above-described name. Additionally or alternatively, a wireless communication technology implemented in a wireless device 100, 200 of the present disclosure may include at least any one of a ZigBee, a Bluetooth and a low power wide area network (LPWAN) considering a low-power communication and it is not limited to the above-described name. In an example, a ZigBee technology may generate PAN(personal area networks) related to a small/low-power digital communication based on a variety of standards such as IEEE 802.15.4, etc. and may be referred to as a variety of names.

A method proposed by the present disclosure is mainly described based on an example applied to 3GPP LTE/LTE-A, 5G system, but may be applied to various wireless communication systems other than the 3GPP LTE/LTE-A, 5G system.

What is claimed is:

1. A method comprising:
receiving configuration information related to a channel state information (CSI) report;
receiving a CSI-reference signal (CSI-RS) based on a resource set for channel measurement, which is related to the CSI report; and
performing the CSI report based on the CSI-RS,
wherein, the resource set includes N (N>1) CSI-RS resources for N transmission and reception points (TRPs), and
wherein, based on the configuration information being related to a coherent joint transmission (CJT), codebook subset restriction information related to a number of antenna ports is respectively configured for the N CSI-RS resources in the configuration information.

2. The method of claim 1,
wherein the configuration information includes N resource configurations for the N TRPs.

3. The method of claim 1,
wherein a type of time domain behavior is commonly configured for the N CSI-RS resources, and
wherein the type of time domain behavior corresponds to at least one of a periodic type, a semi-persistent type, or an aperiodic type.

4. The method of claim 1,
wherein a CSI-RS port index for the resource set is sequentially determined, based on a lowest index or a highest index of at least one of transmission and reception point (TRP) index, cell identifier, CORESET pool index or transmission configuration indicator (TCI) state index.

5. The method of claim 1,
wherein a CSI-RS port index for the resource set is based on a number of CORESET pool indices associated with the resource set, a number of CSI-RS ports associated with each CORESET pool index, and a number of CDM groups.

6. The method of claim 1,
wherein the N CSI-RS are configured to have the same number of CSI-RS ports.

7. The method of claim 1,
wherein a CSI-RS port index for the resource set is sequentially determined, based on a lowest index or a highest index of a CSI-RS resource identifier or a synchronization signal block (SSB) resource index.

8. The method of claim 1,
wherein restriction information on rank indicator value is commonly configured for the N CSI-RS resources in the configuration information.

9. The method of claim 1,
wherein a CSI-RS port mapping for the N CSI-RS resources included the resource set is sequentially determined based on a pre-configured index related to a CSI-RS.

10. An apparatus comprising:
at least one transceiver; and
at least one processor coupled with the at least one transceiver,
wherein the at least one processor is configured to:
receive configuration information related to a channel state information (CSI) report;
receive a CSI-reference signal (CSI-RS) based on a resource set for channel measurement, which is related to the CSI report; and
perform the CSI report based on the CSI-RS, wherein, the resource set includes N (N>1) CSI-RS resources for N transmission and reception points (TRPs), and wherein, based on the configuration information being related to a coherent joint transmission (CJT), codebook subset restriction information related to a number of antenna ports is respectively configured for the N CSI-RS resources in the configuration information.

11. The apparatus of claim 10,
wherein the configuration information includes N resource configurations for the N TRPs.

12. The apparatus of claim 10,
wherein a type of time domain behavior is commonly configured for the N CSI-RS resources, and
wherein the type of time domain behavior corresponds to at least one of a periodic type, a semi-persistent type, or an aperiodic type.

13. The apparatus of claim 10,
wherein a CSI-RS port index for the resource set is sequentially determined, based on a lowest index or a highest index of at least one of transmission and reception point (TRP) index, cell identifier, CORESET pool index or transmission configuration indicator (TCI) state index.

14. The apparatus of claim 10,
wherein a CSI-RS port index for the resource set is based on a number of CORESET pool indices associated with the resource set, a number of CSI-RS ports associated with each CORESET pool index, and a number of CDM groups.

15. The apparatus of claim 10,
wherein the N CSI-RS resources are configured to have the same number of CSI-RS ports.

16. The apparatus of claim 10,
wherein restriction information on rank indicator value is commonly configured for the N CSI-RS resources in the configuration information.

17. The apparatus of claim 10,
wherein a CSI-RS port mapping for the N CSI-RS resources included the resource set is sequentially determined based on a pre-configured index related to a CSI-RS.

18. An apparatus comprising:
at least one transceiver; and
at least one processor coupled with the at least one transceiver,
wherein the at least one processor is configured to:
transmit configuration information related to a channel state information (CSI) report;
transmit a CSI-reference signal (CSI-RS) based on a resource set for channel measurement, which is related to the CSI report; and
receive the CSI report based on the CSI-RS,
wherein, the resource set includes N (N>1) CSI-RS resources for N transmission and reception points (TRPs), and
wherein, based on the configuration information being related to a coherent joint transmission (CJT), codebook subset restriction information related to a number of antenna ports is respectively configured for the N CSI-RS resources in the configuration information.

* * * * *